United States Patent
Chopard et al.

(10) Patent No.: US 11,407,282 B2
(45) Date of Patent: Aug. 9, 2022

(54) INSTALLATION FOR THE THERMAL CONDITIONING OF A PASSENGER COMPARTMENT AND/OR AT LEAST ONE COMPONENT OF A MOTOR VEHICLE

(71) Applicant: Hutchinson, Paris (FR)

(72) Inventors: Fabrice Chopard, Saint-Martin-d'Hères (FR); Hélder Filipe De Campos Garcia, Châlette-sur-Loing (FR); Mathieu Leborgne, Montargis (FR)

(73) Assignee: Hutchinson, Paris (FR)

(*) Notice: Subject to any disclaimer, the term of this patent is extended or adjusted under 35 U.S.C. 154(b) by 220 days.

(21) Appl. No.: 16/341,161

(22) PCT Filed: Oct. 10, 2017

(86) PCT No.: PCT/FR2017/052774
§ 371 (c)(1),
(2) Date: Apr. 11, 2019

(87) PCT Pub. No.: WO2018/069629
PCT Pub. Date: Apr. 19, 2018

(65) Prior Publication Data
US 2020/0189357 A1    Jun. 18, 2020

(30) Foreign Application Priority Data
Oct. 13, 2016  (FR) ........................... 1659891

(51) Int. Cl.
*B60H 1/14*    (2006.01)
*B60H 1/00*    (2006.01)
*B60H 1/32*    (2006.01)

(52) U.S. Cl.
CPC ......... *B60H 1/143* (2013.01); *B60H 1/00492* (2013.01); *B60H 1/00499* (2019.05);
(Continued)

(58) Field of Classification Search
CPC ............... B60H 1/00499; B60H 1/143; B60H 1/00492; B60H 1/005; B60H 1/32281;
(Continued)

(56) References Cited

U.S. PATENT DOCUMENTS 5,735,133 A * 4/1998 Voss ....................... B60H 1/005
                                                                62/185
8,371,512 B2 * 2/2013 Douarre ................. B60H 1/004
                                                                237/2 B
(Continued)

FOREIGN PATENT DOCUMENTS

DE    196 25 927 A1    1/1998
DE    100 65 279 C1    7/2002
(Continued)

OTHER PUBLICATIONS

EP 2263894 A1 English Machine Translation (Year: 2010).*

*Primary Examiner* — Jenna M Hopkins
(74) *Attorney, Agent, or Firm* — Blank Rome LLP

(57) ABSTRACT

The invention concerns an installation for the thermal conditioning of a passenger compartment and/or at least one component of a motor vehicle, comprising a first circuit (1) for circulating a heat transfer fluid, a second circuit (2) for circulating a refrigerant fluid, capable of forming a heat pump type circuit, the heat transfer fluid circuit comprising heating and/or cooling means (M1, M2, M3) for at least one component of a motor vehicle, means (S1, S2) for storing calories and/or frigories, a first exchanger (E1) forming an evaporator and capable of exchanging heat with the refrigerant circuit, and means for circulating the heat transfer fluid capable of drawing the frigories and/or calories from the storage means (S1, S2) or the first exchanger (E1), so as to transfer them to the heating and/or cooling means (M1, M2, M3).

16 Claims, 25 Drawing Sheets

Figure 1:
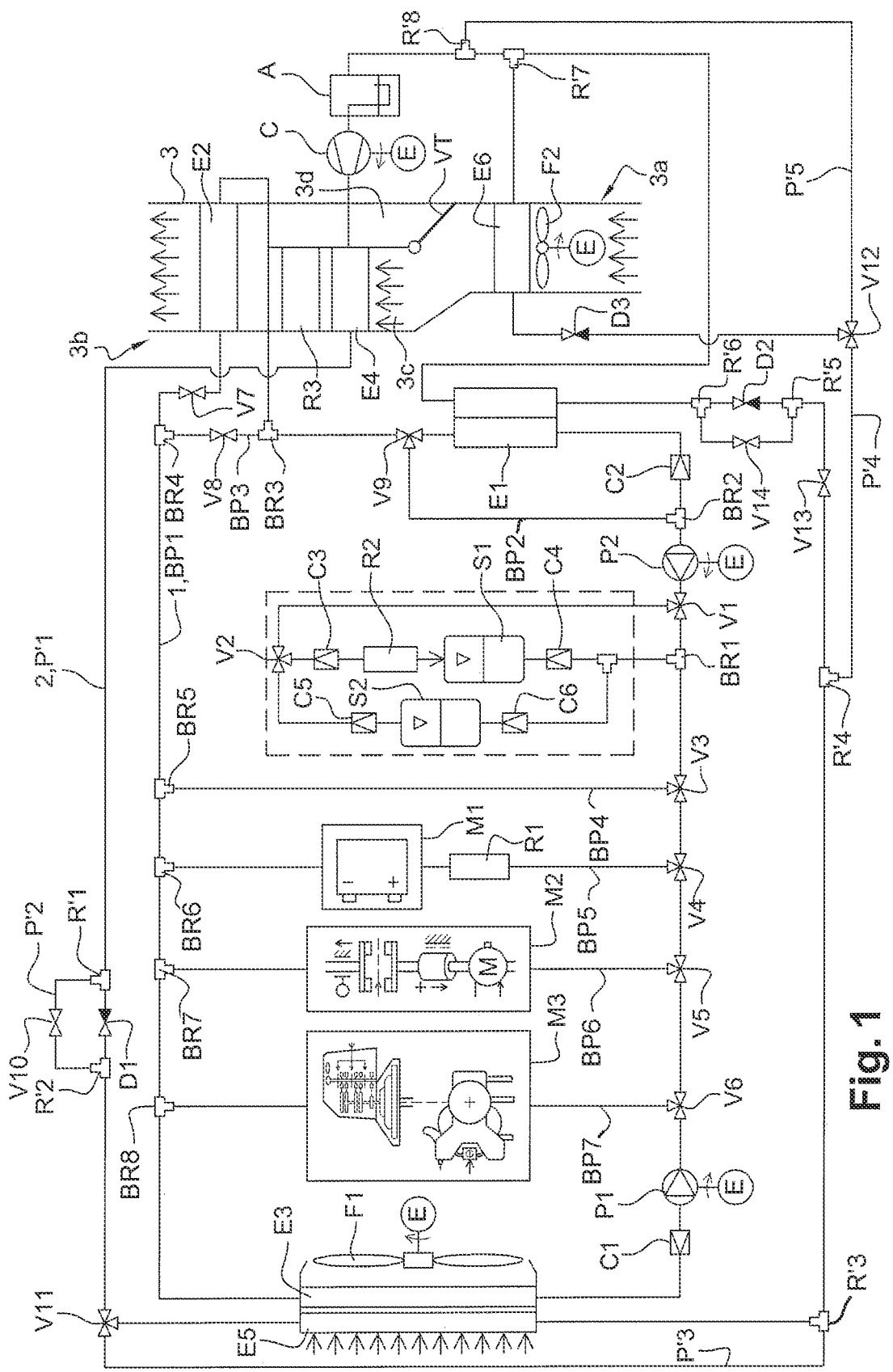

(52) U.S. Cl.
CPC ..... *B60H 1/00885* (2013.01); *B60H 1/00921* (2013.01); *B60H 1/32281* (2019.05); *B60H 1/005* (2013.01); *B60H 1/00278* (2013.01); *B60H 1/323* (2013.01); *B60H 1/3227* (2013.01); *B60H 2001/00928* (2013.01); *B60H 2001/00949* (2013.01)

(58) Field of Classification Search
CPC .. B60H 1/3204; B60H 1/3205; B60H 1/3222; B60H 1/3223; B60H 1/3225; B60H 1/3226; B60H 1/3227; B60H 1/3229; B60H 1/323; B60H 1/3232; B60H 1/00885; B60H 1/00921; B60H 1/00278; B60H 2001/00928; B60H 2001/00949
See application file for complete search history.

(56) References Cited

U.S. PATENT DOCUMENTS

| | | |
|---|---|---|
| 9,796,241 B2 | 10/2017 | Takeuchi et al. |
| 9,821,630 B2 * | 11/2017 | Goenka ................ F25B 25/005 |
| 10,093,146 B2 | 10/2018 | Fürll et al. |
| 2002/0100290 A1 | 8/2002 | Herta et al. |
| 2006/0137853 A1 * | 6/2006 | Haller .................... B60H 1/323 165/42 |
| 2014/0041826 A1 * | 2/2014 | Takeuchi ........... B60H 1/00899 165/10 |
| 2015/0266392 A1 | 9/2015 | Arai et al. |
| 2017/0182864 A1 | 6/2017 | Heyl |
| 2018/0086177 A1 * | 3/2018 | Agathocleous .... B60H 1/00492 |
| 2021/0394580 A1 * | 12/2021 | Chopard ................ G08G 1/143 |

FOREIGN PATENT DOCUMENTS

| | | | |
|---|---|---|---|
| EP | 2 253 495 A2 | 11/2010 | |
| EP | 2 263 894 A1 | 12/2010 | |
| EP | 2263894 A1 * | 12/2010 | ......... B60H 1/00899 |
| EP | 2 524 829 A1 | 11/2012 | |
| EP | 2 611 634 A1 | 7/2013 | |
| FR | 2 950 424 A1 | 3/2011 | |
| JP | H07-76208 A | 3/1995 | |
| JP | 2012-232730 A | 11/2012 | |
| JP | 2014-19438 A | 2/2014 | |

* cited by examiner

INSTALLATION FOR THE THERMAL CONDITIONING OF A PASSENGER COMPARTMENT AND/OR AT LEAST ONE COMPONENT OF A MOTOR VEHICLE

This invention concerns an installation for the thermal conditioning of a passenger compartment and/or at least one component of a motor vehicle.

Known installations are suitable for heating or cooling (air conditioning) the passenger compartment of a vehicle, as well as heating or cooling a vehicle component, such as the battery.

Electric vehicles use electric motors coupled to inverters, which tend to heat up during use. In addition, a hybrid vehicle also includes an internal combustion engine capable of driving the vehicle, alternately or in addition to the electric motors.

In order to ensure optimal operation of these components, it is useful to condition them thermally, i.e. to maintain their temperature within a specific temperature range. For example, the optimal temperature range of a battery is between 0 and 55° C., preferably between 25 and 35° C.

At the same time, the installation must also be able to ensure effective conditioning of the passenger compartment, particularly when the outside air is relatively cold or hot. There is a need to be able to quickly condition the passenger compartment, especially when the passenger compartment is at temperatures far below the comfort temperature desired by the user.

One of the aims of the invention is to provide a simple, effective and economical solution to these problems.

To this end, it proposes a thermal conditioning installation for a passenger compartment and/or at least one component of a motor vehicle, comprising:
  a first circuit for the circulation of a heat transfer fluid,
  a second circuit for circulating a refrigerant fluid, capable of forming a heat pump type circuit,
  characterized in that the heat transfer fluid circuit includes heating and/or cooling means intended to heat and/or cool at least one component of a motor vehicle, such as for example a battery, an electric motor or an internal combustion engine, means for storing calories and/or frigories, a first heat exchanger forming an evaporator and capable of exchanging heat with the refrigerant circuit, and means for circulating the heat transfer fluid, capable of drawing frigories and/or calories from the storage means or the first exchanger, in order to transfer them to the heating and/or cooling means.

Storage means allow calories or frigories to be delivered very quickly to the air entering the vehicle's passenger compartment, so that the vehicle's temperature can be quickly brought back to a set temperature. These calories or frigories can also be used to condition the vehicle's component.

The first heat exchanger provides an interface between the refrigerant circuit and the heat transfer fluid circuit, so that the heat pump can be used to cool the vehicle component to be conditioned, or to recharge a heat storage unit, if necessary.

The heat pump circuit can include at least one compressor, at least one heat exchanger forming a condenser, at least one expansion valve and at least one heat exchanger forming an evaporator.

The heat pump circuit can also include an accumulator, also called an expansion tank, upstream of the compressor.

The heat transfer fluid circuit may include a second heat exchanger capable of heating or cooling air intended to enter the passenger compartment of the vehicle, the means of circulation of the heat transfer fluid being capable of drawing frigories and/or calories from the storage means or the first exchanger, so as to transfer them to the second exchanger.

The second exchanger is located, for example, in a duct of a heating, ventilation and/or air conditioning installation, also known as a HVAC system, said duct being intended to lead to the passenger compartment of the vehicle.

The storage means can be a removable storage device, which can be either a calorie storage device or a frigorie storage device, depending on the needs.

Alternatively, the storage means can include at least one calorie storage device and at least one frigorie storage device.

The storage means may include a phase-change material, for example water, glycol, saline solution or paraffin. In particular, the phase-change material (PCM) may consist of n-hexadecane, eicosane or a lithium salt, all having melting points below 40° C. Alternatively, the PCM could be based e.g. on fatty acid, paraffin, or eutectic or hydrated salt, or even fatty alcohols. Such thermal storage means make it possible to accumulate thermal energy (calories or frigories) by latent heat (phase change) or by sensitive heat.

The heat transfer fluid circuit may include a third heat exchanger capable of exchanging heat with outside air, the means of circulating the heat transfer fluid being capable of transferring frigories from the third heat exchanger to at least one of the vehicle components, for example to the internal combustion engine or electric motor, and/or the battery.

In this way, the third heat exchanger allows, at least in part, to cool at least one of the vehicle's components.

The third exchanger is located on the front of the vehicle, for example.

The third heat exchanger makes it possible to compensate for any lack of cooling capacity supplied by the first heat exchanger, depending on the external and/or internal conditions of the vehicle.

The refrigerant circuit may include a fourth heat exchanger capable of forming a condenser and capable of exchanging heat with air intended to enter the passenger compartment of the vehicle.

The fourth exchanger is located, for example, in the duct of a heating, ventilation and/or air conditioning (HVAC) installation.

The refrigerant circuit may include a fifth heat exchanger capable of forming an evaporator and/or condenser and capable of exchanging heat with air outside the vehicle.

The fifth exchanger is located on the front of the vehicle, for example.

The refrigerant circuit may include a sixth heat exchanger capable of forming an evaporator and capable of exchanging heat with air intended to enter the passenger compartment of the vehicle.

The sixth exchanger is located, for example, in a duct of a H.V.A.C. type installation.

The heat transfer fluid circuit may include first heating means, such as a first electrical resistor, capable of heating the heat transfer fluid upstream of one of the vehicle components.

These first heating means are located upstream of the battery, for example, in such a way as to operate in addition to the corresponding cooling and/or heating means.

The heat transfer fluid circuit may include second heating means, such as a second electrical resistor, suitable for heating the heat transfer fluid intended to circulate in the heat storage unit.

The second means of heating can thus work in addition to the elements already present, to ensure or facilitate the storage of calories in the calorie storage device.

The installation may include third heating means, such as a third electrical resistance, capable of heating the air intended to enter the vehicle interior.

The third heating means can thus operate in addition to the second heat exchanger and/or the fourth heat exchanger, for example.

The heat transfer fluid circuit may include bypass means allowing all or part of the heat transfer fluid to bypass said heating and/or cooling means.

The installation may include means for circulating the heat transfer fluid and means for circulating the refrigerant fluid designed to operate in at least one of the following modes:

- a mode (first mode) in which the heat transfer fluid circulates in a loop comprising at least successively the heat storage unit, optionally the heating and/or cooling means, and the second exchanger,
- a mode (second mode) in which the heat transfer fluid flows in a loop comprising at least successively the heating and/or cooling means and the first exchanger, the refrigerant fluid flowing in a loop comprising at least successively a compressor, the fourth exchanger, a first expansion valve, the fifth exchanger, a first part of the refrigerant fluid then passing through a second expansion valve and the first exchanger before returning to the compressor, while a second part of the refrigerant fluid is derived towards the compressor,
- a mode (third mode) in which the heat transfer fluid flows in a first loop comprising at least successively the heating and/or cooling means of a first member, such as a battery, and the first exchanger, and optionally in a second loop comprising at least successively the heating and/or cooling means of a second member, such as an electric motor, and/or the heating and/or cooling means of a third member, such as an internal combustion engine, and the third exchanger, the refrigerant fluid circulating in a loop comprising at least successively the compressor, the fourth exchanger, the first expansion valve, the fifth exchanger, a first part of the refrigerant fluid then passing through the first exchanger before returning to the compressor, while a second part of the refrigerant fluid is derived towards the compressor,
- a mode (fourth mode) in which the heat transfer fluid circulates in a first loop comprising at least successively the heating and/or cooling means (M1, M2) of the first and/or second member, and the first exchanger, and optionally in a second loop comprising at least successively the heating and/or cooling means of the third member, and the third exchanger, the refrigerant flowing in a loop comprising at least successively the compressor, the fourth exchanger, the first expansion valve, the fifth exchanger, a first part of the refrigerant then passing through the first exchanger before returning to the compressor, while a second part of the refrigerant is diverted to the compressor,
- a mode (fifth mode) in which the heat transfer fluid circulates in a loop comprising at least successively the heating and/or cooling means and the first exchanger, the refrigerant fluid circulating in a loop comprising at least successively the compressor, the fourth exchanger, the second expansion valve and the first exchanger,
- a mode (sixth mode) in which the heat transfer fluid circulates in a first loop comprising at least successively the heating and/or cooling means of the first member, and the first exchanger, and optionally in a second loop comprising at least successively the heating and/or cooling means of the second member and/or the third member, and the third exchanger, the refrigerant fluid circulating in a loop comprising at least successively the compressor, the fourth exchanger, the second expansion valve and the first exchanger,
- a mode (seventh mode) in which the heat transfer fluid circulates in a first loop comprising at least successively the heating and/or cooling means of the first and/or second member, and the first exchanger, and optionally in a second loop comprising at least successively the heating and/or cooling means of the third member, and the third exchanger, the refrigerant fluid circulating in a loop comprising at least successively the compressor, the fourth exchanger, the second expansion valve and the first exchanger,
- a mode (eighth mode) in which the heat transfer fluid circulates in a loop comprising at least successively the heat storage device and the heating and/or cooling means, the refrigerant fluid circulating in a loop comprising at least successively the compressor, the fourth exchanger, the first expansion valve, and the fifth exchanger,
- a mode (ninth mode) in which the heat transfer fluid circulates in a first loop comprising at least successively the heat storage device and the heating and/or cooling means of the first component, and optionally in a second loop comprising at least successively the heating and/or cooling means of the second component and/or the third component, and the third exchanger, the refrigerant fluid circulating in a loop comprising at least successively the compressor, the fourth exchanger, the first expansion valve and the fifth exchanger,
- a mode (tenth mode) in which the heat transfer fluid circulates in a first loop comprising at least successively the heat storage and the heating and/or cooling means of the first and/or second member, and optionally in a second loop comprising at least successively the heating and/or cooling means of the third member, and the third exchanger, the refrigerant fluid circulating in a loop comprising at least successively the compressor, the fourth exchanger, the first expansion valve and the fifth exchanger,
- a mode (eleventh, twelfth or twenty-fifth mode) in which the heat transfer fluid circulates in a loop comprising at least successively the heating and/or cooling means and the third exchanger,
- a mode (thirteenth mode) in which the heat transfer fluid circulates in a loop comprising at least successively the heating and/or cooling means of the second and/or third member, and the third exchanger,
- a mode (fourteenth mode) in which the heat transfer fluid circulates in a loop comprising at least successively the heating and/or cooling means, and the third exchanger, the refrigerant fluid circulating in a loop comprising at least successively the compressor, the fourth exchanger, the first expansion valve, and the fifth exchanger, a mode (fifteenth mode) in which the heat transfer fluid circulates in a first loop comprising at least successively the heating and/or cooling means, and the first exchanger, and optionally in a second loop comprising at least successively the heating and/or cooling means of the third member, and the third exchanger, the refrigerant fluid circulating in a loop comprising at least successively the compressor, the fourth exchanger, the first expansion valve, the second expansion valve and the first exchanger, a mode (sixteenth mode) in which the heat transfer fluid circulates in a first loop comprising at least successively the heating and/or cooling means of the first member, and the first exchanger, and optionally in a second loop comprising at least successively the heating and/or cooling means of the second member and/or the third member, and the third exchanger, the refrigerant fluid circulating in a loop comprising at least successively the compressor, the fourth exchanger, the second expansion valve and the first exchanger, a mode (seventeenth mode) in which the heat transfer fluid circulates in a loop comprising at least successively the heating and/or cooling means of the second and/or third member, and the third exchanger, the refrigerant fluid circulating in a loop comprising at least successively the compressor, the fifth exchanger, a third expansion valve and the sixth exchanger, a mode (eighteenth mode) in which the heat transfer fluid circulates in a first loop comprising at least successively the heating and/or cooling means of the first member, and the first exchanger, and optionally in a second loop comprising at least successively the heating and/or cooling means of the second member and/or the third member, and the third exchanger, the refrigerant fluid circulating in a loop comprising at least successively the compressor, the fifth exchanger, a first part of the refrigerant fluid then passing through the second expansion valve and the first exchanger before returning to the compressor, while a second part of the refrigerant fluid then passes through the third expansion valve and the sixth exchanger before returning to the compressor, a mode (nineteenth mode) in which the heat transfer fluid circulates in a first loop comprising at least successively the heating and/or cooling means of the first and/or second member, and the first exchanger, and optionally in a second loop comprising at least successively the heating and/or cooling means of the third member, and the third exchanger, the refrigerant fluid circulating in a loop comprising at least successively the compressor, the fifth exchanger, a first part of the refrigerant fluid then passing through the second expansion valve and the first exchanger before returning to the compressor, while a second part of the refrigerant fluid then passes through the third expansion valve and the sixth exchanger before returning to the compressor, a mode (twentieth mode) in which the heat transfer fluid circulates in a loop comprising at least successively the frigorie storage unit, optionally the heating and/or cooling means, and the second exchanger, a mode (twenty-first mode) in which the heat transfer fluid circulates in a loop comprising at least successively the heating and/or cooling means, and the first exchanger, the refrigerant fluid circulating in a loop comprising at least successively the compressor, the fifth exchanger, a first part of the refrigerant fluid then passing through the second expansion valve and the first exchanger before returning to the compressor, while a second part of the refrigerant fluid then passes through the third expansion valve and the sixth exchanger before returning to the compressor, a mode (twenty-second mode) in which the heat transfer fluid circulates in a first loop comprising at least successively the heating and/or cooling means of the first member, and the first exchanger, and optionally in a second loop comprising at least successively the heating and/or cooling means of the second member and/or the third member, and the third exchanger, the refrigerant fluid circulating in a loop comprising at least successively the compressor, the fifth exchanger, a first part of the refrigerant fluid then passing through the second expansion valve and the first exchanger before returning to the compressor, while a second part of the refrigerant fluid then passes through the third expansion valve and the sixth exchanger before returning to the compressor, a mode (twenty-third mode) in which the heat transfer fluid circulates in a first loop comprising at least successively the heating and/or cooling means of the first and/or second member, and the first exchanger, and optionally in a second loop comprising at least successively the heating and/or cooling means of the third member, and the third exchanger, the refrigerant fluid circulating in a loop comprising at least successively the compressor, the fifth exchanger, a first part of the refrigerant fluid then passing through the second expansion valve and the first exchanger before returning to the compressor, while a second part of the refrigerant fluid then passes through the third expansion valve and the sixth exchanger before returning to the compressor, a mode (twenty-fourth mode) in which the heat transfer fluid circulates in a loop comprising at least successively the heating and/or cooling means, and the third exchanger, the refrigerant fluid circulating in a loop comprising at least successively the compressor, the fifth exchanger, the third expansion valve and the sixth exchanger, a mode (twenty-fifth mode) in which the heat transfer fluid circulates in a first loop comprising at least successively the frigorie storage unit, optionally the heating and/or cooling means of the first member, and the first exchanger, and optionally in a second loop comprising at least successively the heating and/or cooling means of the second member and/or the third member, and the third exchanger, the refrigerant fluid flowing in a loop comprising at least successively the compressor, the fifth exchanger, a first part of the refrigerant fluid then passing through the second expansion valve and the first exchanger before returning to the compressor, while a second part of the refrigerant fluid then passes through the third expansion valve and the sixth exchanger before returning to the compressor.

Modes 1 to 11 are operating modes in which the air outside the vehicle is relatively cold, for example below 15° C.

Modes 12 to 18 are operating modes in which the air outside the vehicle is temperate, for example between 15 and 25° C.

Modes 19 to 25 are operating modes in which the air outside the vehicle is hot, for example above 25° C.

Of course, the temperature examples given above may differ, depending on the size of the installation's different components and applications. In addition, sunlight can also be taken into account when choosing operating modes.

In the first mode, calories are transferred from the calorie storage unit to the component(s) of the vehicle to be heated, such as for example the battery, electric motor(s) and/or corresponding inverters, and/or the internal combustion engine. The calories from the calorie storage system are also transferred to the second heat exchanger, so as to quickly heat the vehicle's interior and ensure the comfort of users. Such a mode corresponds, for example, to a cold start mode of the vehicle.

In the second mode, the first exchanger cools the heat transfer fluid, cooling the vehicle component(s). In addition, the fourth exchanger, forming a condenser, heats the air intended for the passenger compartment.

In the third mode, the first component is cooled using the frigories provided by the first exchanger. The second and/or third component is cooled by means of the frigories provided by the outside air, via the third exchanger. As before, the fourth heat exchanger heats the air intended for the passenger compartment.

In the fourth mode, the first and/or second component is cooled using the frigories provided by the first exchanger. The third component is cooled by means of the frigories provided by the outside air, via the third exchanger. As before, the fourth heat exchanger heats the air intended for the passenger compartment.

In the fifth mode, the first, second and/or third component is cooled using the frigories provided by the first exchanger. As before, the fourth heat exchanger heats the air intended for the passenger compartment.

In the sixth mode, the first component is cooled using the frigories provided by the first exchanger. The second and/or third component is cooled by means of the frigories provided by the outside air, via the third exchanger. As before, the fourth heat exchanger heats the air intended for the passenger compartment.

In the seventh mode, the first and/or second component is cooled using the frigories provided by the first exchanger. The third component is cooled by means of the frigories provided by the outside air, via the third exchanger. As before, the fourth heat exchanger heats the air intended for the passenger compartment.

In the eighth mode, the calorie storage unit is recharged by the calories resulting from the heating of the vehicle's various component(s) during their use. As before, the fourth heat exchanger heats the air intended for the passenger compartment.

In the ninth mode, the calorie storage unit is recharged by the calories from the warm-up of the first component. In addition, the second and/or third component is cooled by the frigories provided by the outside air, via the third exchanger. As before, the fourth heat exchanger heats the air intended for the passenger compartment.

In the tenth mode, the calorie storage unit is recharged by the calories from the heating of the first component and/or the second component. In addition, the third component is cooled by the frigories provided by the outside air, via the third exchanger. As before, the fourth heat exchanger heats the air intended for the passenger compartment.

In the eleventh mode, the first, second and/or third component is cooled by the frigories provided by the outside air, via the third exchanger.

Modes 2 to 11 may occur, for example, after a certain period of vehicle use, when the above-mentioned components are relatively hot due to their use.

In the twelfth mode, the first, second and/or third component is cooled by the frigories provided by the outside air, via the third exchanger.

In the thirteenth mode, the first, second and/or third component is cooled by the frigories provided by the outside air, via the third exchanger. In addition, the fourth heat exchanger heats the air intended for the passenger compartment.

In the fourteenth mode, the first and/or second component is cooled using the frigories provided by the first exchanger. The third component is cooled by means of the frigories provided by the outside air, via the third exchanger. As before, the fourth heat exchanger heats the air intended for the passenger compartment.

In the fifteenth mode, the first component is cooled using the frigories provided by the first exchanger. The second and/or third component is cooled by means of the frigories provided by the outside air, via the third exchanger. As before, the fourth heat exchanger heats the air intended for the passenger compartment.

In the sixteenth mode, the second and/or third component is cooled using the frigories provided by the outside air, via the third exchanger. In addition, the sixth exchanger, forming an evaporator, cools the air intended for the passenger compartment.

In the seventeenth mode, the first component is cooled using the frigories provided by the first exchanger. The second and/or third component is cooled by means of the frigories provided by the outside air, via the third exchanger. As before, the sixth exchanger cools the air intended for the passenger compartment.

In the eighteenth mode, the first and/or second component is cooled using the frigories provided by the first exchanger. The third component is cooled by means of the frigories provided by the outside air, via the third exchanger. As before, the sixth exchanger cools the air intended for the passenger compartment.

In the nineteenth mode, the frigories are transferred from the refrigerant storage unit to the component(s) of the vehicle to be cooled, such as for example the battery and/or the electric motor(s) and/or the corresponding inverters, and/or the internal combustion engine. The frigories from the refrigerant storage unit are also transferred to the second heat exchanger, so as to quickly cool the vehicle's interior and ensure user comfort. In the twentieth mode, the first, second and/or third component is cooled using the frigories provided by the first exchanger. In addition, the sixth exchanger cools the air intended for the passenger compartment.

In the twenty-first mode, the first component is cooled using the frigories provided by the first exchanger. The second and/or third component is cooled by means of the frigories provided by the outside air, via the third exchanger. As before, the sixth exchanger cools the air intended for the passenger compartment.

In the twenty-second mode, the first and/or second component is cooled using the frigories provided by the first exchanger. The third component is cooled by means of the frigories provided by the outside air, via the third exchanger. As before, the sixth exchanger cools the air intended for the passenger compartment.

In the twenty-third mode, the first, second and/or third component is cooled using the frigories provided by the outside air, via the third exchanger. As before, the sixth exchanger cools the air intended for the passenger compartment.

In the twenty-fourth mode, the refrigerant storage unit is recharged using the frigories provided by the first exchanger, some of which can be used to cool the first component. The second and/or third component is cooled by means of the frigories provided by the outside air, via the third exchanger. As before, the sixth exchanger cools the air intended for the passenger compartment.

In the twenty-fifth mode, the first, second and/or third component is cooled by the frigories provided by the outside air, via the third exchanger.

The invention will be better understood and other details, characteristics and advantages of the invention will become readily apparent upon reading the following description, given by way of a non limiting example with reference to the appended drawings, wherein:

FIG. 1 is a schematic view of an air-conditioning installation of a passenger compartment and/or of at least one component of a motor vehicle according to one embodiment of the invention, FIGS. 2 to 26 are schematic views corresponding to FIG. 1, and illustrating various operating modes of the installation, FIG. 1 shows an installation for the thermal conditioning of a passenger compartment and/or various components of a motor vehicle, according to one embodiment of the invention.

This installation includes a circuit 1 for circulating a heat transfer fluid, such as glycol water for example.

The heat transfer fluid circuit 1 has:
a first pump P1,
a second pump P2,
a first heat exchanger E1, capable of exchanging heat with a refrigerant fluid,
a second heat exchanger E2, capable of exchanging heat with air,
a third heat exchanger E3, capable of exchanging heat with air,
calorie storage means S1 (also called hot storage),
frigorie storage means S2 (also known as cold storage),
first heating means R1 for heating the heat transfer fluid, such as an electrical resistance, for example,
second heating means R2 for heating the heat transfer fluid, such as an electrical resistance, for example,
check valves C1, C2, C3, C4, C5, C6,
three-way valves V1, V2, V3, V4, V5, V6, V9, the different channels of these valves can be controlled and thermostated,
shut-off valves V7, V8, which may be controlled and thermostated,
heating and/or cooling means M1 for a first vehicle component, such as at least one vehicle battery,
heating and/or cooling means M2 for a second vehicle component, such as at least one electric motor of the vehicle and/or associated components such as an inverter for example,
heating and/or cooling means M3 for a third component of the vehicle, such as a vehicle internal combustion engine, in particular for heating and/or cooling the oil circuit of the internal combustion engine.

In particular, Heat Transfer Fluid Circuit 1 includes:
a portion BP1 forming a loop extending from the inlet of the pump P1 to the outlet of the pump P1 and comprising successively, starting from the outlet of the pump P1, the valve V6, the valve V5, the valve V4, the valve V3, a branch or connection point BR1, the valve V1, pump P2, branch BR2, check valve C2, exchanger E1, valve V9, branch BR3, exchanger E2, shut-off valve V7, branch BR4, branch BR5, branch BR6, branch BR7, branch BR8, third exchanger E3, check valve C1 and pump P1,
a bypass portion BP2 connecting branch BR2 to valve V9,
a bypass portion BP3 connecting branch BR3 to branch BR4, said portion BP3 including shut-off valve V8,
a bypass portion BP4 connecting branch BR5 to valve V3,
a portion BP5 connecting branch BR6 to valve V4, said portion BP5 comprising, from the branch BR6 to the valve V4, the heating and/or cooling means M1 and the heating means R1,
a portion BP6 connecting branch BR7 to valve V5, said portion BP6 including the heating and/or cooling means M2,
a portion BP7 connecting branch BR8 to valve V6, said portion BP7 including the heating and/or cooling means M3.

The installation also includes a refrigerant fluid circuit 2.

The refrigerant fluid is for example of the super-critical fluid type, such as carbon dioxide, for example, known as R744. It can also be a subcritical fluid, such as hydrofluorocarbon known as R134a or a refrigerant fluid with a low greenhouse gas impact, i.e. capable of providing a sustainable solution for automotive air conditioners, known as HFO1234yf.

The refrigerant fluid circuit 2 has:
a compressor C,
a fourth heat exchanger E4, capable of forming a condenser,
a fifth heat exchanger E5, capable of forming an evaporator and/or condenser,
a sixth heat exchanger E6, capable of forming an evaporator,
a first regulator D1,
a second regulator D2,
a third regulator D3,
an accumulator A,
three-way valves V11, V12, the various ways of which may be controlled and thermostated,
shut-off valves V10, V13, V14, which may be controlled and thermostated.

The regulators D1, D2, D3 can be of fixed pressure drop and/or variable opening or variable pressure drop, said opening or pressure drop being capable of being regulated by means of control means not shown.

More specifically, refrigerant fluid circuit 2 includes:
a portion P'1 forming a loop extending from the inlet of the compressor C to the outlet of the compressor C and comprising successively, starting from the outlet of the compressor C, the exchanger E4, a branch R'1, the regulator D1, a branch R'2, the valve V11, the exchanger E5, a branch R'3, a branch R'4, the valve V13, a branch R'5, the regulator D2, a branch R'6, the exchanger E1, a branch R'7, a branch R'8, the accumulator A and the compressor C,
a bypass portion P'2 connecting the branch R'1 to the branch R'2, said portion P'2 including the valve V10,
a bypass portion P'3 connecting the valve V11 to the branch R'3,
a portion P'4 connecting the branch R'4 to the branch R'7 and comprising, from the branch R'4 to the branch R'7, the valve V12, the regulator D3 and the exchanger E6,
a bypass portion P'5 connecting the valve V12 to the branch R'8.

The exchangers E2, E4, E6 are located in an air circulation duct 3 of a heating, ventilation and/or air conditioning installation, also called H.V.A.C., said duct 3 being intended to open into the vehicle interior.

Duct 3 has an upstream zone where air from outside the vehicle is introduced, a median zone, and a downstream zone. The terms "upstream" and "downstream" are defined in relation to the direction of air flow in the duct, this direction being represented by arrows in FIG. 1. The exchanger E6 is mounted in the upstream zone 3a of duct 3. The exchanger E2 is mounted in the downstream zone 3b of duct 3. The middle zone is separated into two channels, namely a first channel 3c in which the exchanger E4 is mounted, and a second channel 3d. The two channels 3c and 3d meet in the downstream zone 3b of duct 3. Heating means R3, such as an electrical resistance, are installed in channel 3c, for example downstream of the exchanger E4.

A VT shutter whose position is controlled is located upstream of channels 3c and 3d and allows the fluid to flow selectively in channel 3c or channel 3d. The VT shutter can also circulate a specific part of the fluid in channel 3c and a specific part of the fluid in channel 3d.

The installation also includes a fan F1 to force the passage of outside air through exchangers E3 and E5, located for example on the front of the vehicle, and a second fan F2, mounted for example in the upstream zone 3a of duct 3, so as to force the passage of air through duct 3.

Pumps P1, P2, compressor C and fans F1, F2 are driven by electric motors E.

The installation also includes sensors for measuring, for example, the temperature, flow rate and/or pressure of the heat transfer fluid, refrigerant fluid and/or air, control means for controlling the various actuators (motors, valves, etc.) and calculation means, in particular with the information from said sensors as input, for outputting information to the said control means.

Of course, the embodiment illustrated in FIG. 1 is not exhaustive, other embodiments may be considered to perform the functions described below.

With reference to FIGS. 2 to 12, different operating modes are now described in which the air outside the vehicle is relatively cold, for example below 15° C.

In each of the modes described below, only the active elements, fulfilling a function or through which the heat transfer and refrigerant fluids circulate, have been represented, in order to facilitate understanding.

Figure 2:
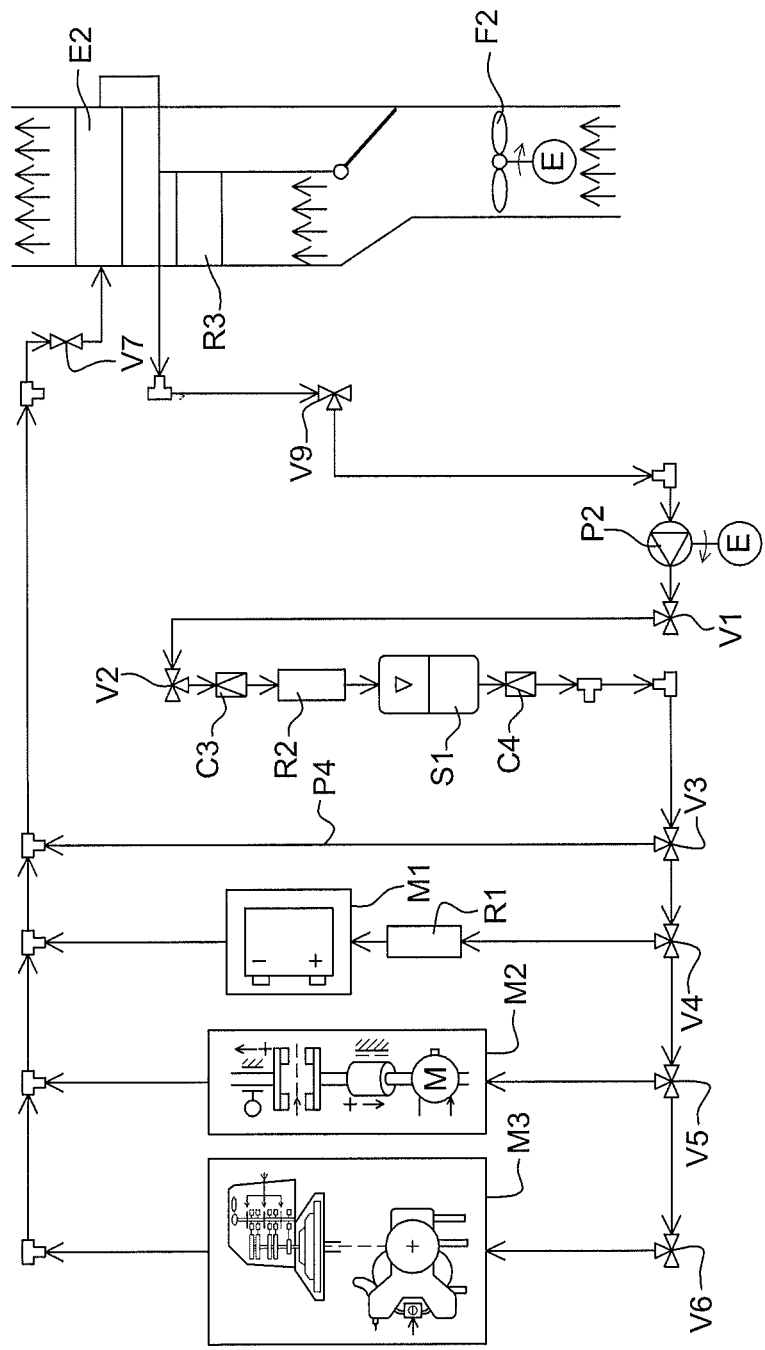

FIG. 2 illustrates a first operating mode of the installation, in which the heat transfer fluid successively passes through pump P2, valve V1, valve V2, check valve C3, heating means R2 (active or not depending on the needs), heat storage unit S1 (this one being completely loaded with calories), the heat transfer fluid can then pass through one or more of the heating and/or cooling means R1 and M1 (the means R1 being active or not), M2, M3, via valves V4, V5, V6, and/or be derived from said means R1 and M1 (the means R1 being active or not), M2, M3, via line BP4 and valve V3, all the heat transfer fluid then passing through valve V7, exchanger E2 and valve V9 before passing through pump P2 again.

In this first mode, calories can be transferred from the calorie storage unit S1 to the component(s) of the vehicle to be heated, such as for example the battery, electric motor(s) and/or corresponding inverters, and/or the internal combustion engine, via means R1 and M1 (the means R1 being active or not), M2, M3, and/or to the exchanger E2, so as to quickly heat the vehicle interior and ensure the comfort of the users. Such a mode corresponds, for example, to a cold start mode of the vehicle.

Figure 3:
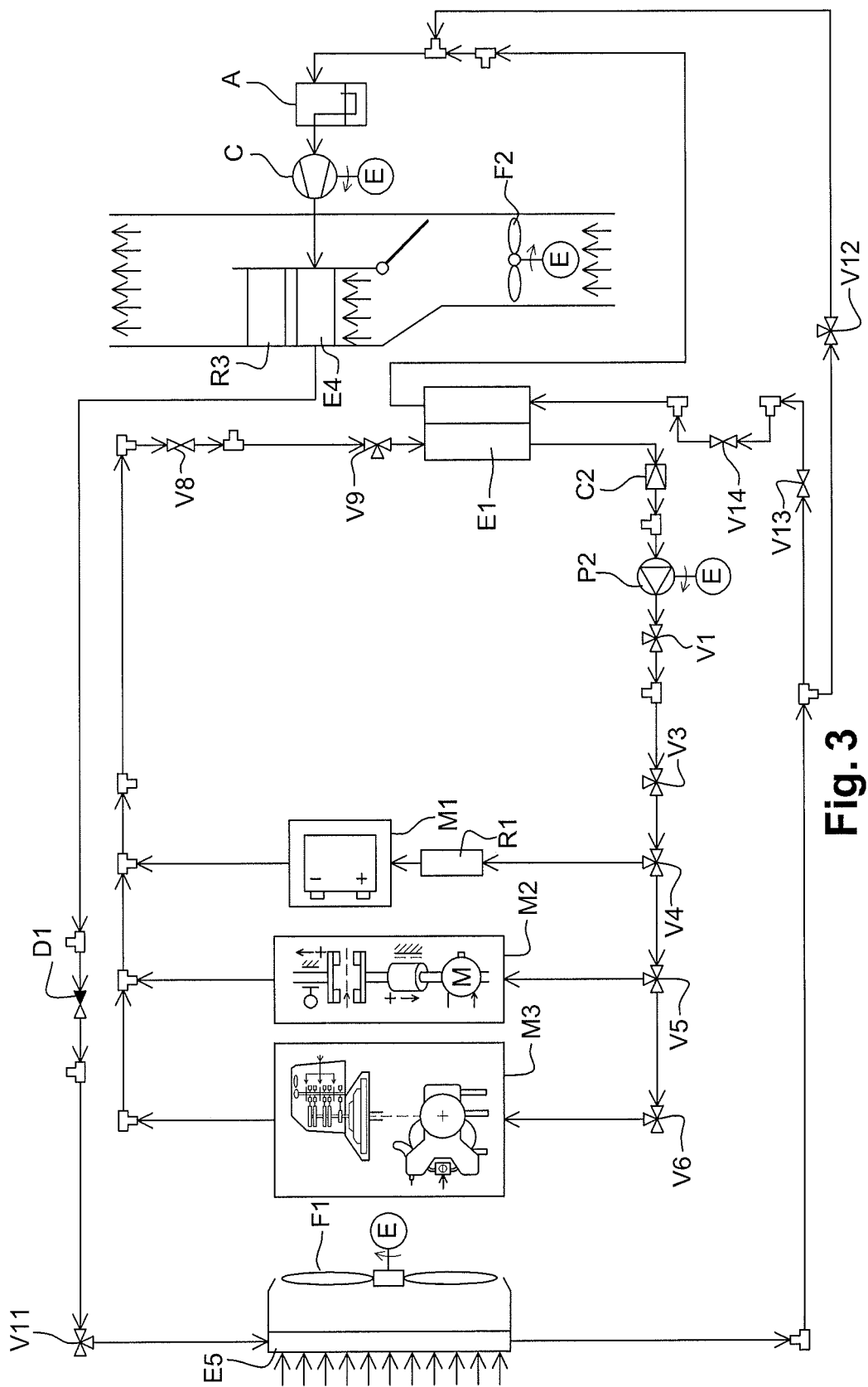

FIG. 3 illustrates a second operating mode of the installation, in which:
  the heat transfer fluid from pump P2 successively passes through valve V1, valve V3, at least one of the heating and/or cooling means R1 and M1 (the means R1 being active or not), M2, M3 via valves V4, V5, V6, valve V8, valve V9, exchanger E1 and check valve C2, before passing through pump P2 again,
  the refrigerant fluid from compressor C successively passes through exchanger E4, regulator D1, valve V11, exchanger E5, a first part of the refrigerant fluid passing through valve V13, valve V14, exchanger E1 and accumulator A before passing through compressor C again, while a second part of the refrigerant fluid is diverted upstream from accumulator A via valve V12.

In this second mode, the exchanger E1 cools the heat transfer fluid, so as to cool the vehicle component(s) through means R1 and M1 (the means R1 being active or not), M2, M3. In addition, the exchanger E4, forming a condenser, heats the air intended for the passenger compartment. The heating means E3 can also be activated in addition, depending on the needs.

Figure 4:
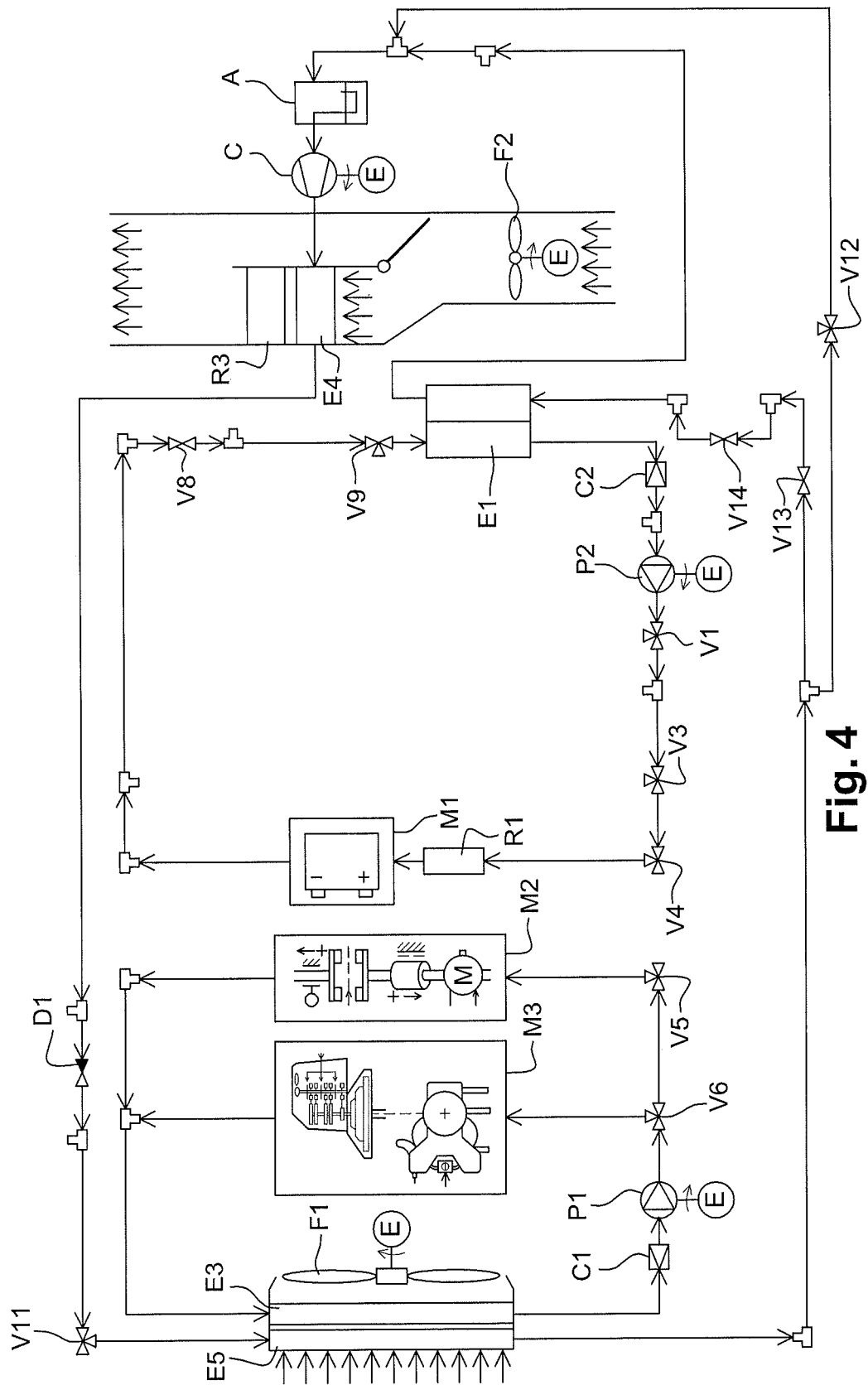

FIG. 4 illustrates a third operating mode of the installation, in which:
  the heat transfer fluid circulates in a first loop in which the fluid from pump P2 flows successively through valve V1, valve V3, valve V4, heating means R1 (active or not according to requirements), heating and/or cooling means M1, valve V8, valve V9, exchanger E1 and valve C2, before re-entering pump P2, and in a second loop in which the fluid from pump P1 successively passes through the heating and/or cooling means M2 and/or M3, via the valves V5, V6, exchanger E3 and check valve C1 before re-entering pump P1,
  the refrigerant fluid from compressor C successively passes through exchanger E4, regulator D1, valve V11, exchanger E5, a first part of the refrigerant fluid passing through valve V13, valve V14, exchanger E1 and accumulator A before passing through compressor C again, while a second part of the refrigerant fluid is diverted upstream from accumulator A, through valve V12.

In the third mode, the first component is cooled using the frigories provided by the exchanger E1. The second and/or third component is cooled using the frigories provided by the outside air, via the exchanger E3. As before, the exchanger E4 heats the air intended for the passenger compartment. The heating means R3 can be activated in addition, as needed.

Figure 5:
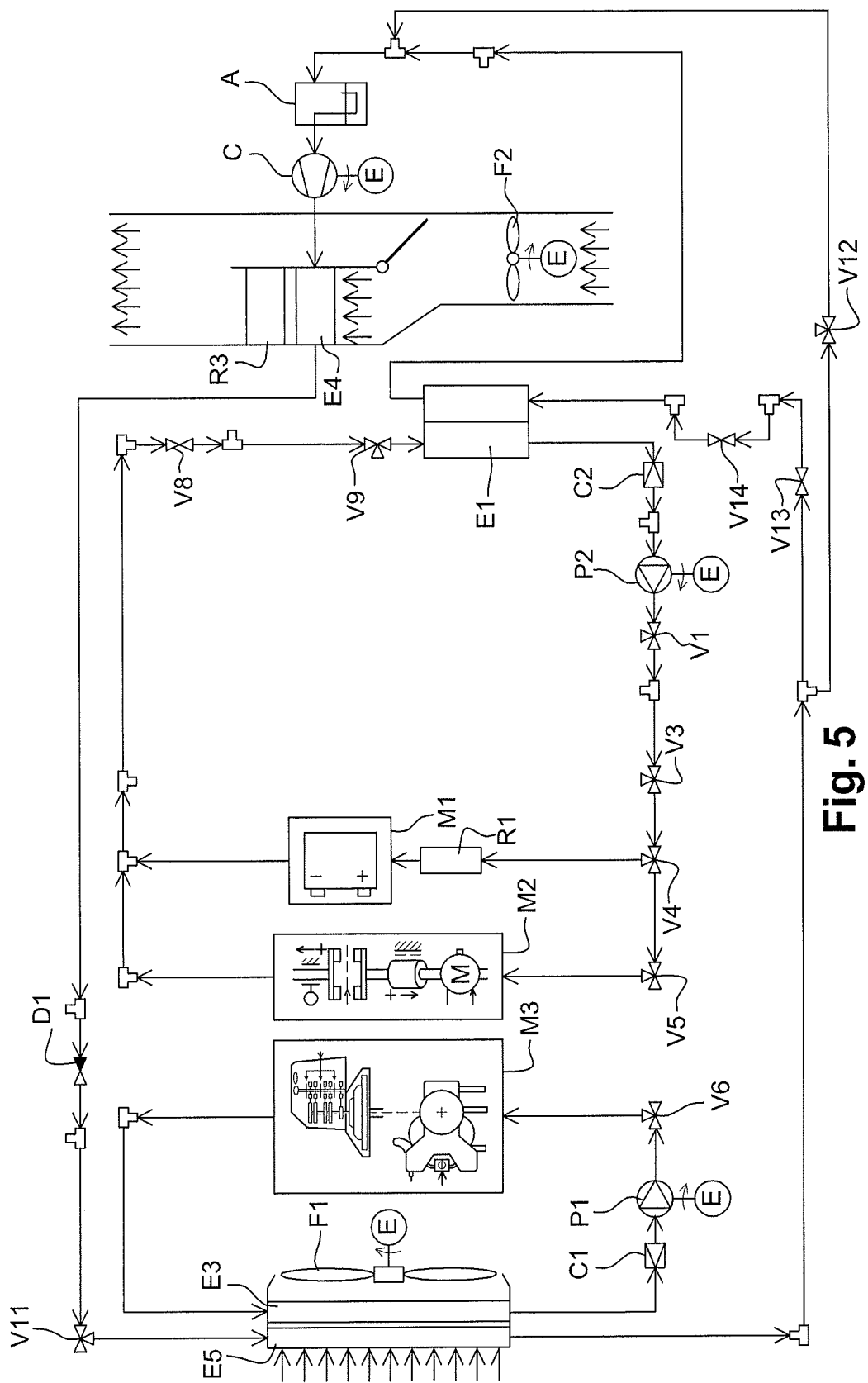

FIG. 5 illustrates a fourth operating mode of the installation, in which:
  the heat transfer fluid circulates in a first loop in which the heat transfer fluid from pump P2 successively passes through valve V1, means R1 and M1 (means R1 being active or not as needed) and/or means M2, via valves V4, V5, valve V8 and valve V9, the exchanger E1 and the check valve C2 before passing through pump P2 again, and in a second loop in which the heat transfer fluid from pump P1 successively passes through the valve V6, the heating and/or cooling means M3, the exchanger E3 and the check valve C1 before passing through pump P1 again,
  the refrigerant fluid from compressor C successively passes through exchanger E4, regulator D1, valve V11, exchanger E5, a first part of the refrigerant fluid passing through valve V13, valve V14, exchanger E1 and accumulator A before passing through compressor C again, while a second part of the refrigerant fluid is diverted upstream of accumulator A, via valve V12.

In the fourth mode, the first and/or second component is cooled using the frigories provided by the exchanger E1. The third component is cooled using the frigories provided by the outside air, via the exchanger E3. As before, the exchanger E4 heats the air intended for the passenger compartment. The heating means R3 can be activated in addition, as needed.

Figure 6:
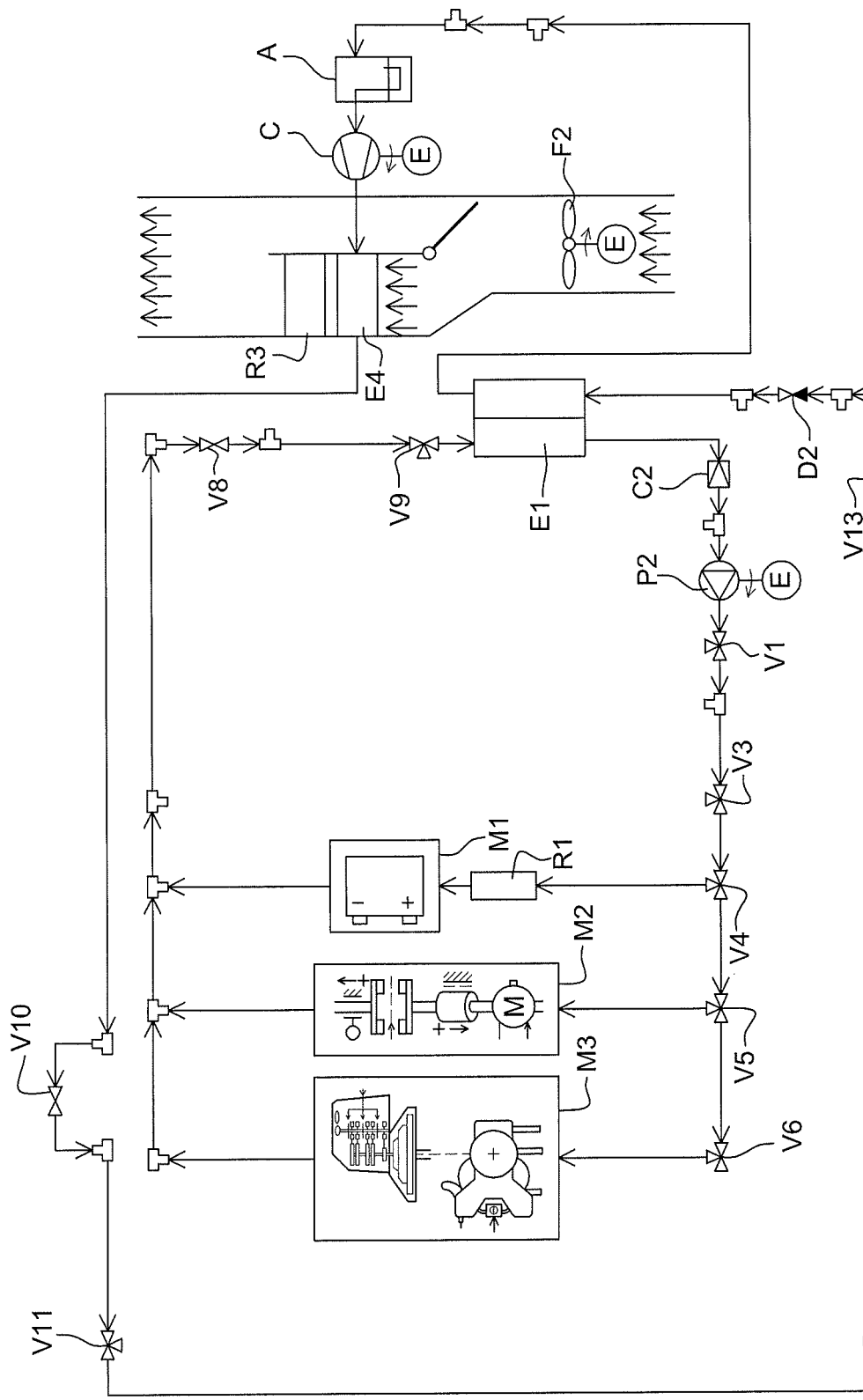

FIG. 6 illustrates a fifth operating mode of the installation, in which:
- the heat transfer fluid from pump P2 successively passes through valve V1, valve V3, at least one of the heating and/or cooling means R1 and M1 (the means R1 being active or not), M2, M3 via valves V4, V5, V6, valve V8, valve V9, exchanger E1 and check valve C2, before passing through pump P2 again,
- the refrigerant fluid from compressor C passes through exchanger E4, valve V10, valve V11, valve V13, regulator D2, exchanger E1 and accumulator A in succession, before passing through compressor C again.

In the fifth mode, the first, second and/or third component is cooled using the frigories provided by the exchanger E1. As before, the exchanger E4 heats the air intended for the passenger compartment. The heating means R3 can be activated in addition, as needed.

Figure 7:
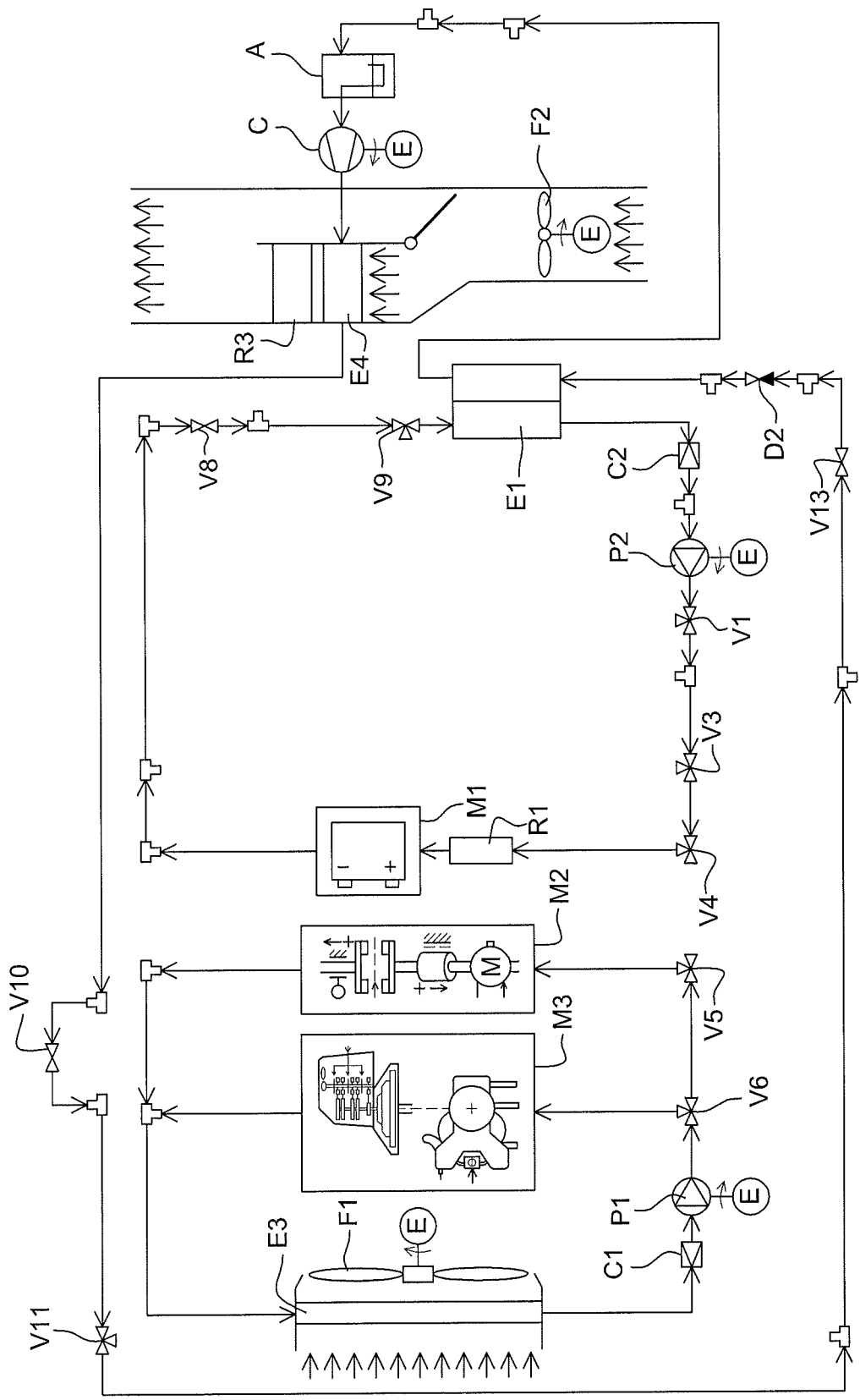

FIG. 7 illustrates a sixth operating mode of the installation, in which:
- the heat transfer fluid circulates in a first loop in which the fluid from pump P2 flows successively through valve V1, valve V3, valve V4, heating means R1 (active or not as needed), heating and/or cooling means M1, valve V8, valve V9, exchanger E1 and check valve C2, before re-entering pump P2, and in a second loop in which the fluid from pump P1 successively passes through the heating and/or cooling means M2 and/or M3, via the valves V5, V6, exchanger E3 and check valve C1 before re-entering pump P1,
- the refrigerant fluid from compressor C passes through exchanger E4, valve V10, valve V11, valve V13, regulator D2, exchanger E1 and accumulator A in succession, before passing through compressor C again.

In the sixth mode, the first component is cooled using the frigories provided by the exchanger E1. The second and/or third component is cooled using the frigories provided by the outside air, via the exchanger E3. As before, the exchanger E4 heats the air intended for the passenger compartment. The heating means R3 can be activated in addition, as needed.

Figure 8:
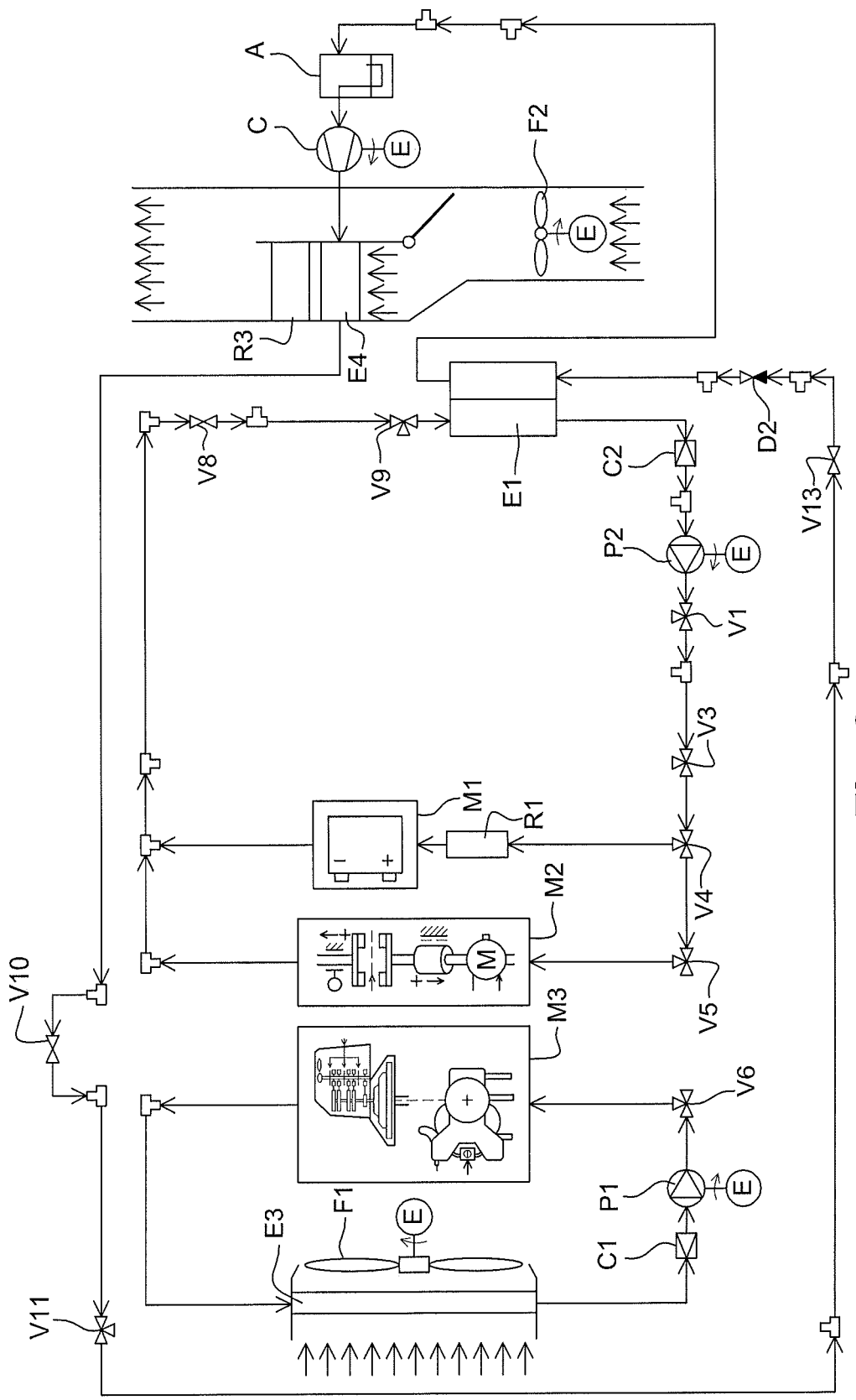

FIG. 8 illustrates a seventh operating mode of the installation, in which:
- the heat transfer fluid circulates in a first loop in which the heat transfer fluid from pump P2 successively passes through valve V1, means R1 and M1 (means R1 being active or not as needed) and/or means M2, via valves V4, V5, valve V8 and valve V9, the exchanger E1 and the check valve C2 before passing through pump P2 again, and in a second loop in which the heat transfer fluid from pump P1 successively passes through the valve V6, the heating and/or cooling means M3, the exchanger E3 and the check valve C1 before passing through pump P1 again,
- the refrigerant fluid from compressor C passes through exchanger E4, valve V10, valve V11, valve V13, regulator D2, exchanger E1 and accumulator A in succession, before passing through compressor C again.

In the seventh mode, the first and/or second component is cooled using the frigories provided by the exchanger E1. The third component is cooled using the frigories provided by the outside air, via the exchanger E3.

Figure 9:
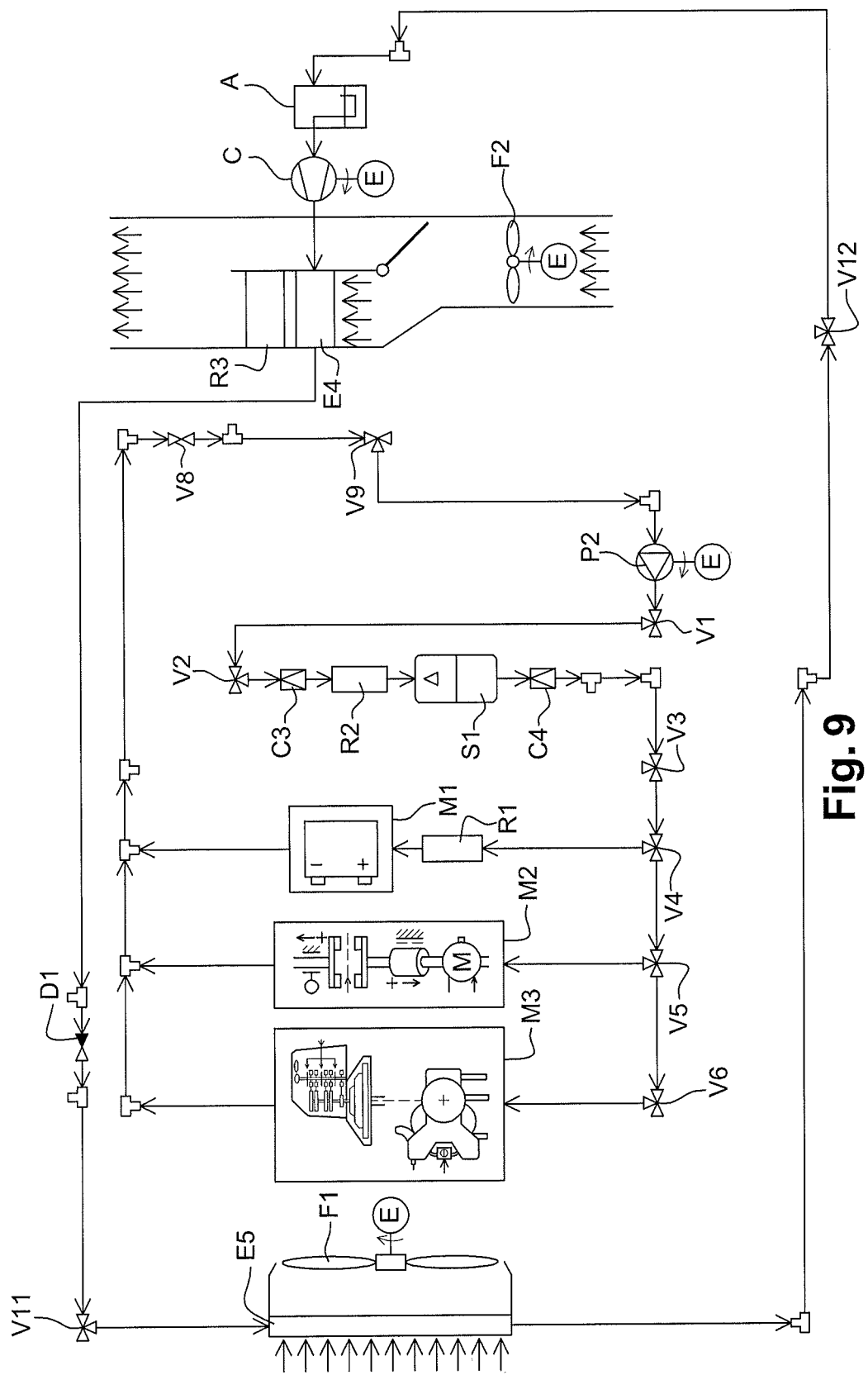

FIG. 9 illustrates an eighth operating mode of the installation, in which:
- the heat transfer fluid from pump P2 successively passes through valve V1, valve V2, check valve C3, heating means R2 (active or not according to requirements), heat storage unit S1, check valve C4, valve V3, at least one of heating and/or cooling means R1 and M1 (means R1 being active or not), M2, M3 via valves V4, V5, V6, valve V8 and valve V9 before passing through pump P2 again,
- the refrigerant fluid from compressor C flows successively through the exchanger E4, the regulator D1, the valve V11, the exchanger E5, the valve V12 and the accumulator A before passing through compressor C again.

In the eighth mode, the calorie storage unit S1 is recharged by the calories resulting from the heating of the vehicle's various component(s) during their use. As before, the exchanger E4 heats the air intended for the passenger compartment. The heating means R3 can be activated in addition, as needed.

Figure 10:
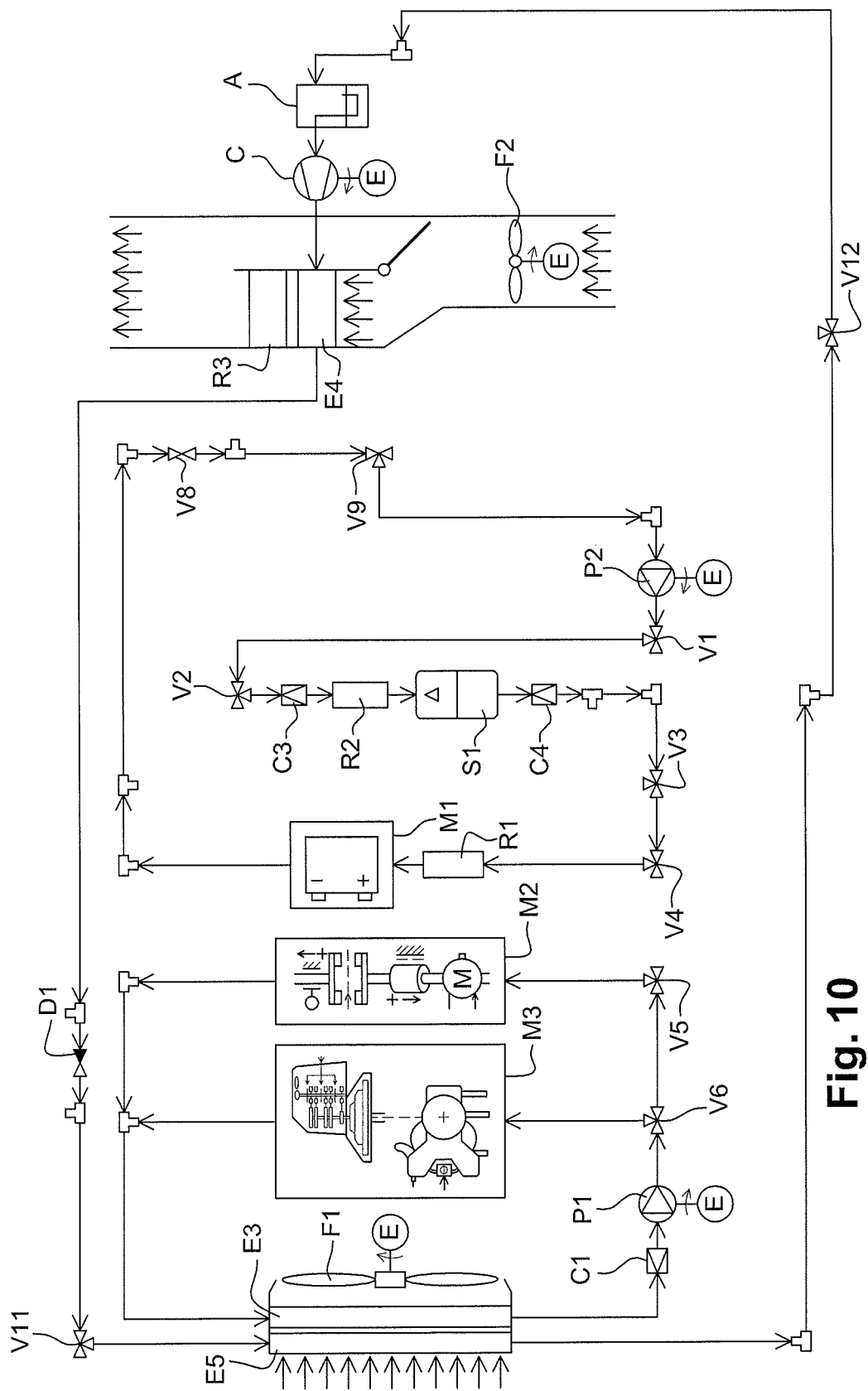

FIG. 10 illustrates a ninth operating mode of the installation, in which:
- the heat transfer fluid circulates in a first loop in which the heat transfer fluid from pump P2 successively passes through valve V1, valve V2, check valve C3, heating means R2 (active or not according to requirements), heat storage device S1, check valve C4, valve V3, valve V4, heating means R1 (active or not), heating and/or cooling means M1, the valve V8 and the valve V9 before passing through pump P2 again, and in a second loop in which the heat transfer fluid from pump P1 successively passes through the heating and/or cooling means M2 and/or M3, via the valves V5, V6, the exchanger E3 and the check valve C1 before passing through pump P1 again,
- the refrigerant fluid from compressor C flows successively through the exchanger E4, the regulator D1, the valve V11, the exchanger E5, the valve V12 and the accumulator A before passing through compressor C again.

In the ninth mode, the heat storage device S1 is recharged by the calories from the warm-up of the first component. In addition, the second and/or third component is cooled by the frigories provided by the outside air, via the exchanger E3. As before, the exchanger E4 heats the air intended for the passenger compartment. The heating means R3 can be activated in addition, as needed.

Figure 11:
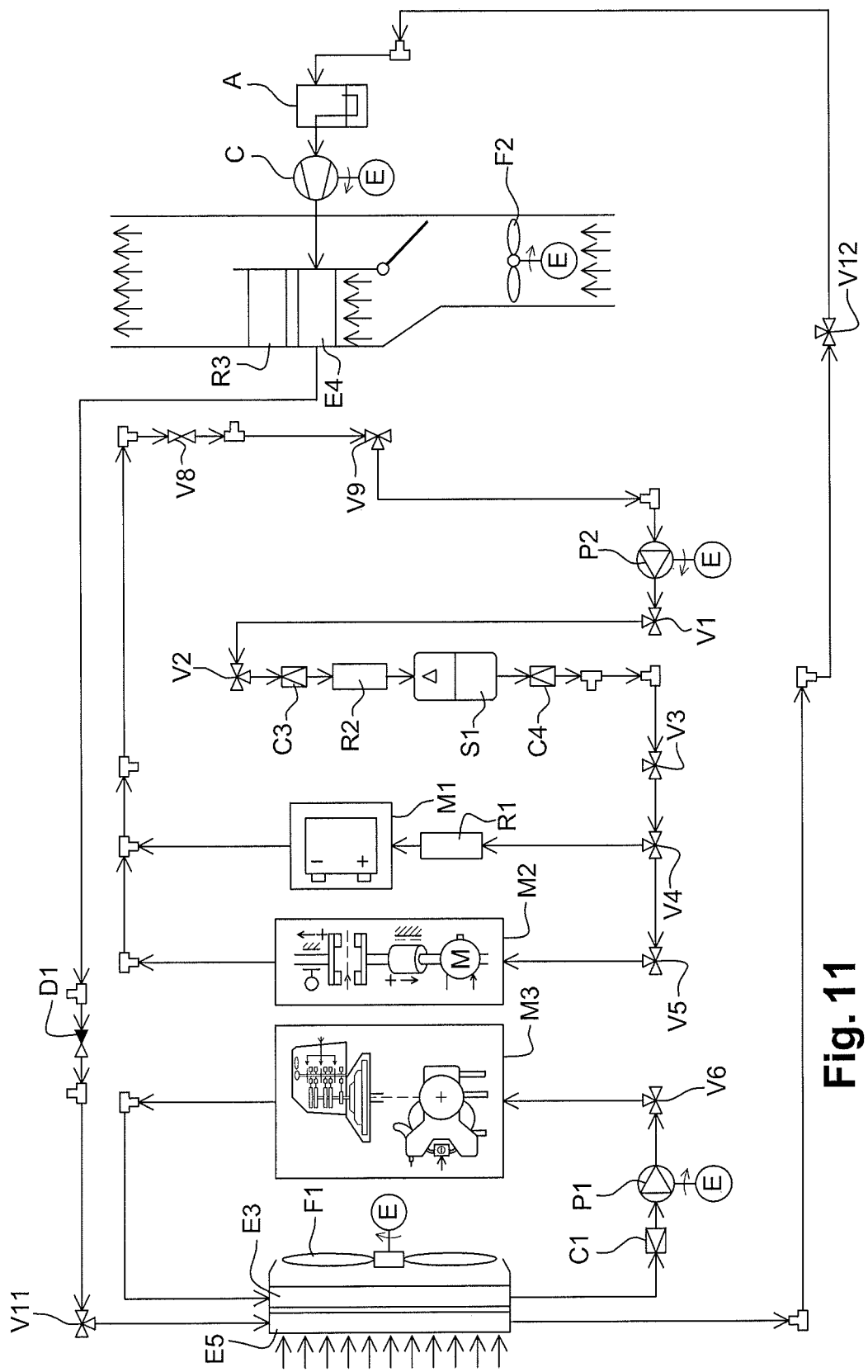

FIG. 11 illustrates a tenth operating mode of the installation, in which:
- the heat transfer fluid circulates in a first loop in which the heat transfer fluid from pump P2 successively passes through valve V1, valve V2, check valve C3, heating means R2 (active or not according to requirements), heat storage device S1, check valve C4, valve V3, heating and/or cooling means R1 (active or not), M1 and/or M2, through the valves V4, V5, V8 and V9 before passing through pump P2 again, and in a second loop in which the heat transfer fluid from pump P1 passes through valve V6, heating and/or cooling means M3, exchanger E3 and check valve C1 in succession before passing through pump P1 again, the refrigerant fluid from compressor C flows successively through the exchanger E4, the regulator D1, the valve V11, the exchanger E5, the valve V12 and the accumulator A before passing through compressor C again.

In the tenth mode, the heat storage device S1 is recharged by the calories from the heating of the first and/or the second component. In addition, the third component is cooled by the frigories provided by the outside air, via the exchanger E3. As before, the exchanger E4 heats the air intended for the passenger compartment. The heating means R3 can be activated in addition, as needed.

Figure 12:
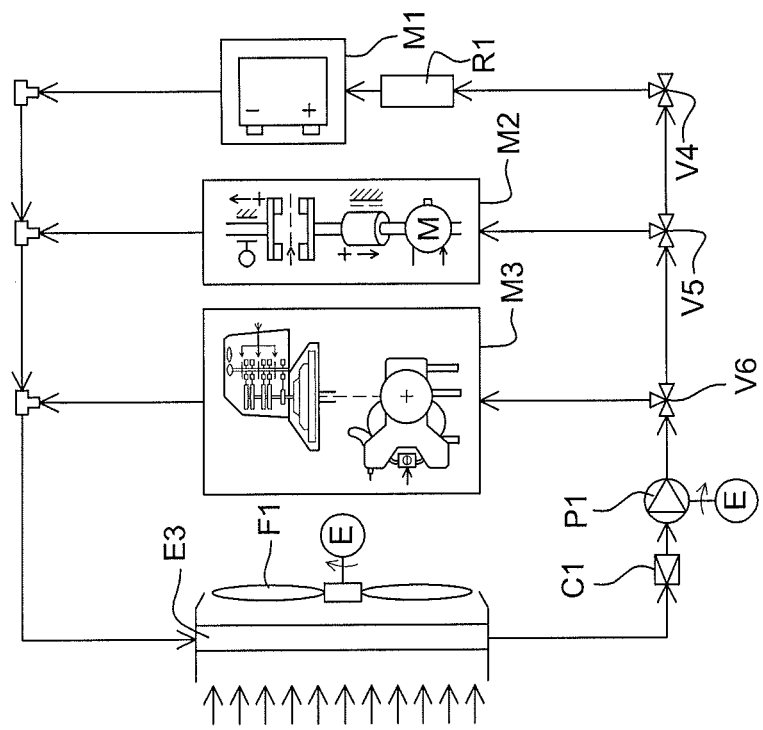

FIG. 12 illustrates an eleventh operating mode of the installation, in which the heat transfer fluid flows in a loop through the pump P1, one or more of the heating and/or cooling means R1 and M1 (the means R1 being active or not), M2, M3, via the valves V4, V5, V6, the exchanger E3 and the check valve C1 before passing through the pump P1 again.

In the eleventh mode, the first, second and/or third component is cooled by the frigories provided by the outside air, via the exchanger E3.

Modes 2 to 11 may occur, for example, after a certain period of vehicle use, when the above-mentioned components are relatively hot due to their use.

With reference to FIGS. 13 to 19, different operating modes in which the air outside the vehicle is tempered, for example between 15 and 25° C., will now be described.

Figure 13:
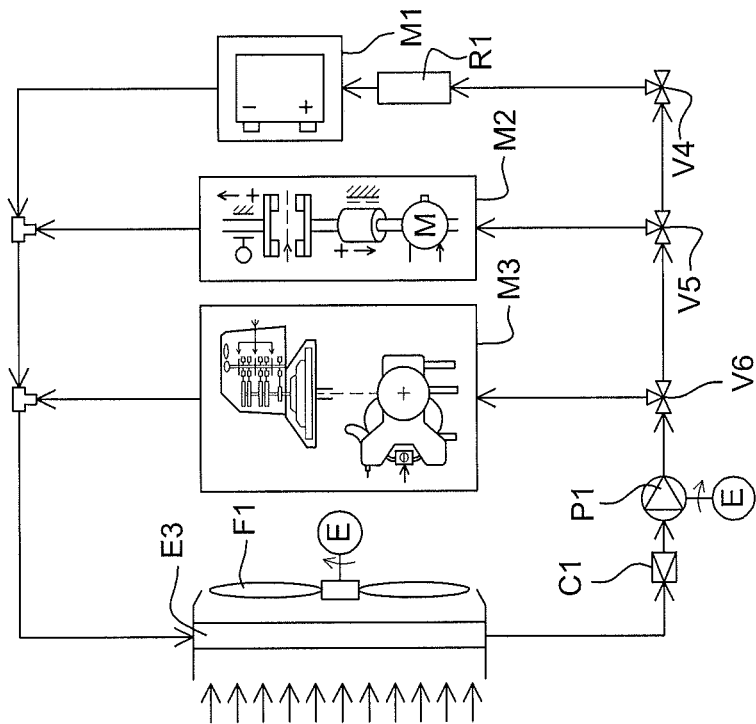

FIG. 13 illustrates a twelfth operating mode of the installation, in which the heat transfer fluid from the pump P1 passes through the heating and/or cooling means M1 and R1, and/or M2 and/or M3, via the valves V4, V5, V6, the exchanger E3 and the check valve C1 in succession before passing through the pump P1 again.

In the twelfth mode, the first, second and/or third component is cooled by the frigories provided by the outside air, via the exchanger E3.

Figure 14:
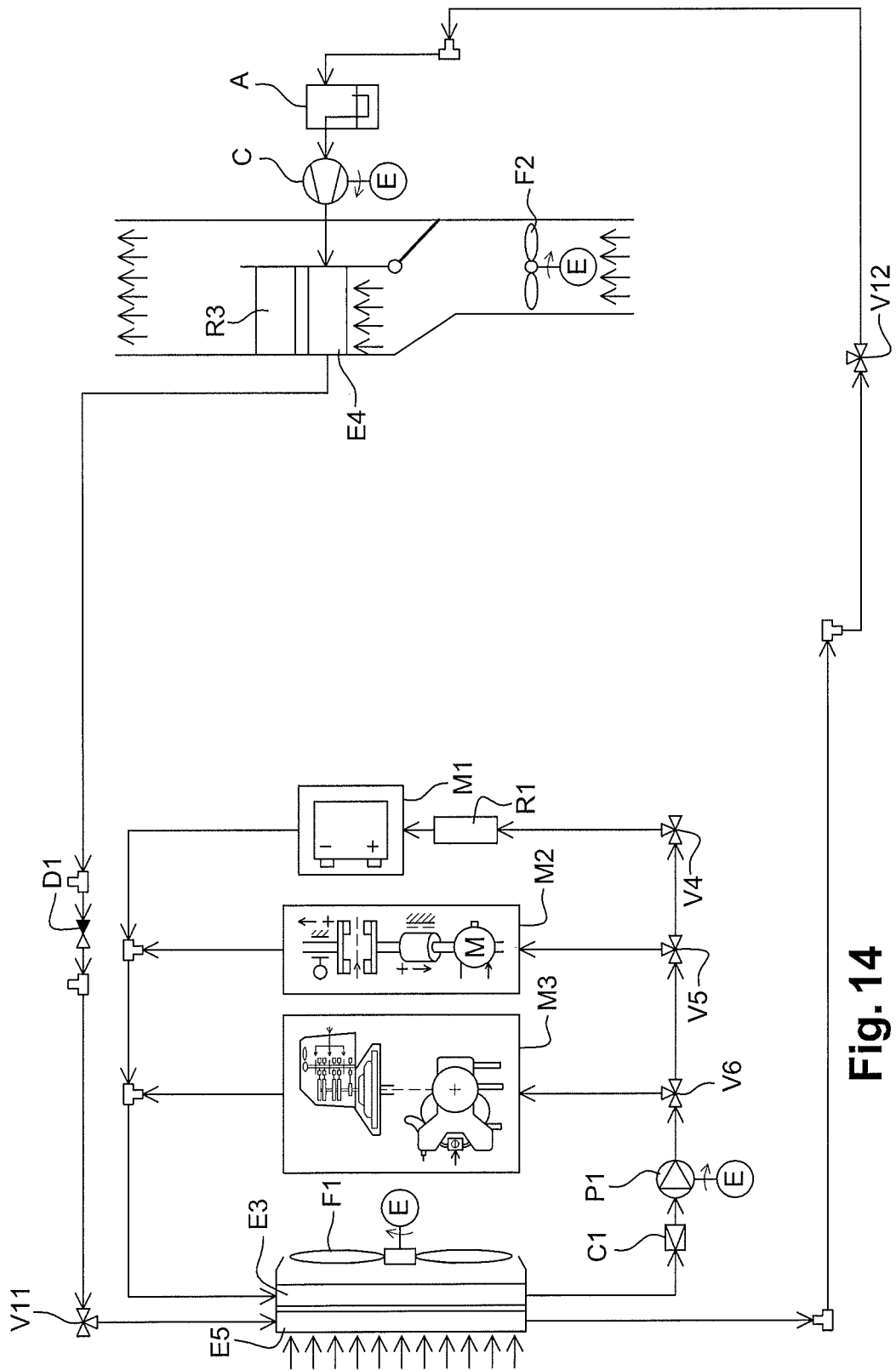

FIG. 14 illustrates a thirteenth operating mode of the installation, in which:
- the heat transfer fluid from the pump P1 flows successively through the heating and/or cooling means M1 and R1, and/or M2 and/or M3, via the valves V4, V5, V6, the exchanger E3 and the check valve C1 before passing through the pump P1 again,
- the refrigerant fluid from compressor C flows successively through the exchanger E4, the regulator D1, the valve V11, the exchanger E5, the valve V12 and the accumulator A before passing through compressor C again.

In the thirteenth mode, the first, second and/or third component is cooled by the frigories provided by the outside air, via the exchanger E3. In addition, the exchanger E4 heats the air intended for the passenger compartment. The heating means R3 can be activated in addition, as needed.

Figure 15:
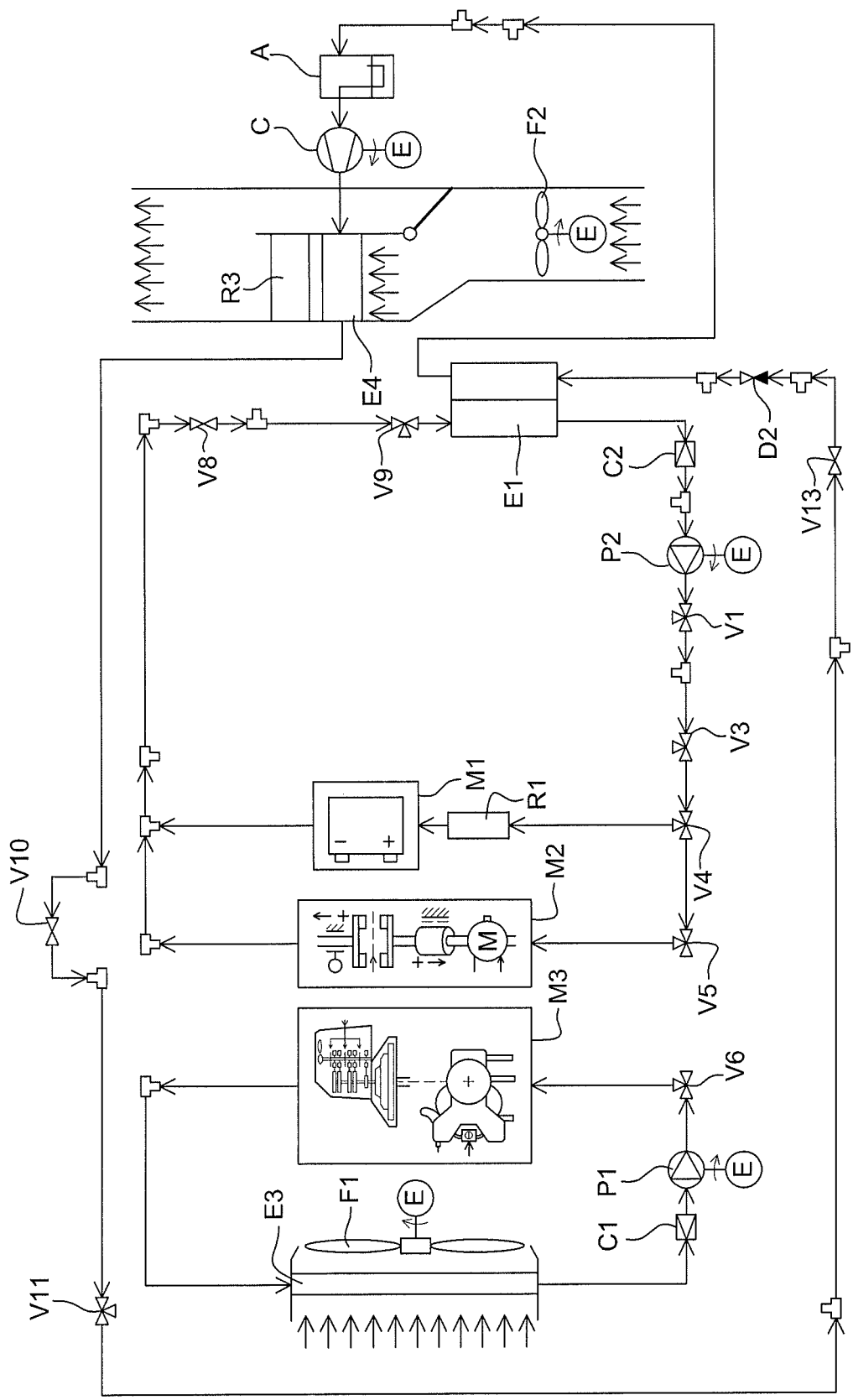

FIG. 15 illustrates a fourteenth operating mode of the installation, in which:
- the heat transfer fluid circulates in a first loop in which the heat transfer fluid from pump P2 successively passes through valve V1, means R1 AND M1 (means R1 being active or not according to requirements) and/or means M2, via valves V4, V5, valve V8 and valve V9, the exchanger E1 and the check valve C2 before passing through pump P2 again, and in a second loop in which the heat transfer fluid from pump P1 successively passes through the valve V6, the heating and/or cooling means M3, the exchanger E3 and the check valve C1 before passing through pump P1 again,
- the refrigerant fluid from compressor C passes through exchanger E4, valve V10, valve V11, valve V13, regulator D2, exchanger E1 and accumulator A in succession, before passing through compressor C again.

In the fourteenth mode, the first and/or second component is cooled using the frigories provided by the exchanger E1. The third component is cooled using the frigories provided by the outside air, via the exchanger E3. As before, the exchanger E4 heats the air intended for the passenger compartment. The heating means R3 can be activated in addition, as needed.

Figure 16:
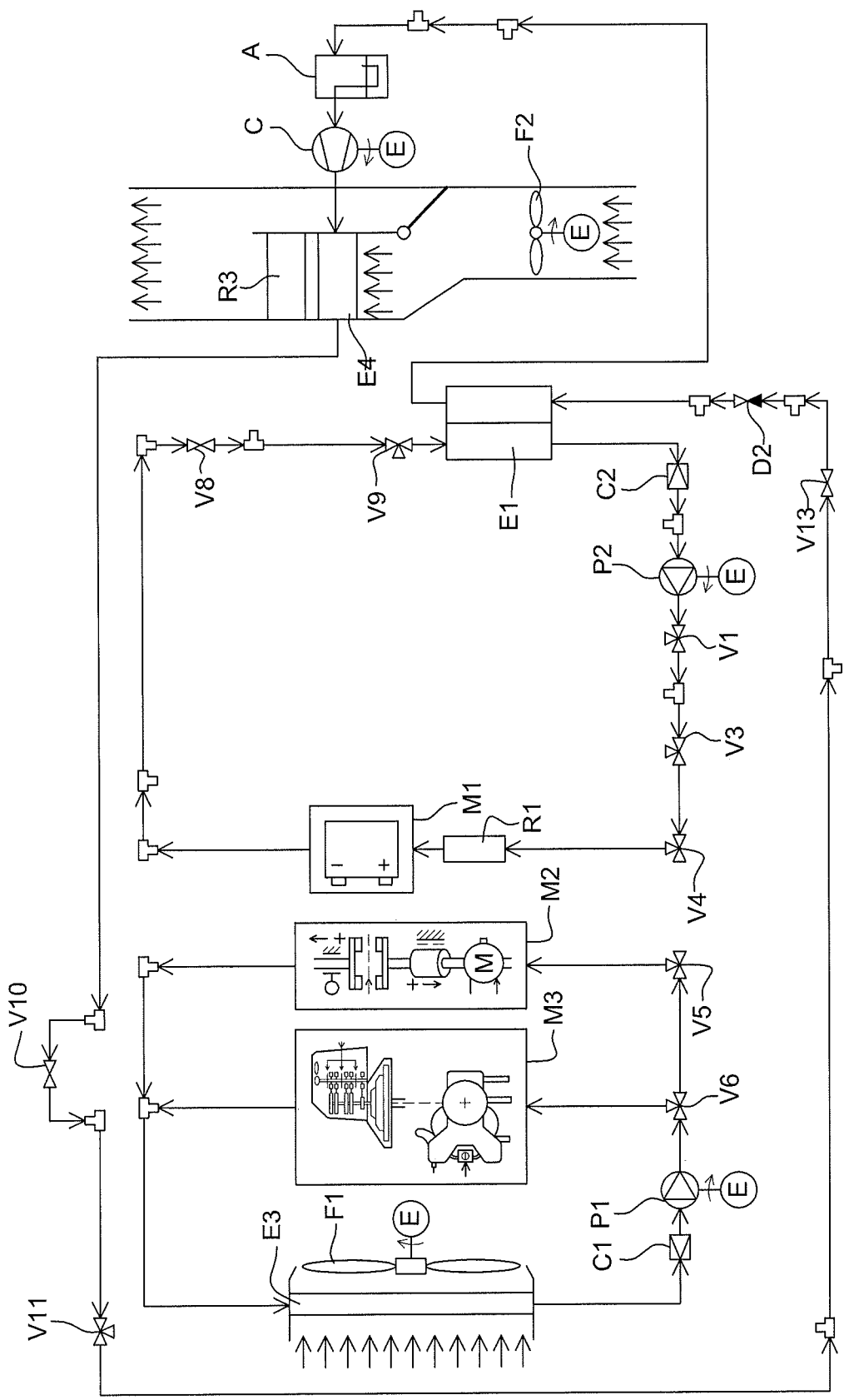

FIG. 16 illustrates a fifteenth operating mode of the installation, in which:
- the heat transfer fluid circulates in a first loop in which the fluid from pump P2 flows successively through valve V1, valve V3, valve V4, heating means R1 (active or not as needed), heating and/or cooling means M1, valve V8, valve V9, exchanger E1 and check valve C2, before re-entering pump P2, and in a second loop in which the fluid from pump P1 successively passes through the heating and/or cooling means M2 and/or M3, via the valves V5, V6, exchanger E3 and check valve C1 before re-entering pump P1,
- the refrigerant fluid from compressor C passes through exchanger E4, valve V10, valve V11, valve V13, regulator D2, exchanger E1 and accumulator A in succession, before passing through compressor C again.

In the fifteenth mode, the first component is cooled using the frigories provided by the exchanger E1. The second and/or third component is cooled using the frigories provided by the outside air, via the exchanger E3. As before, the exchanger E4 heats the air intended for the passenger compartment. The heating means R3 can be activated in addition, as needed.

Figure 17:
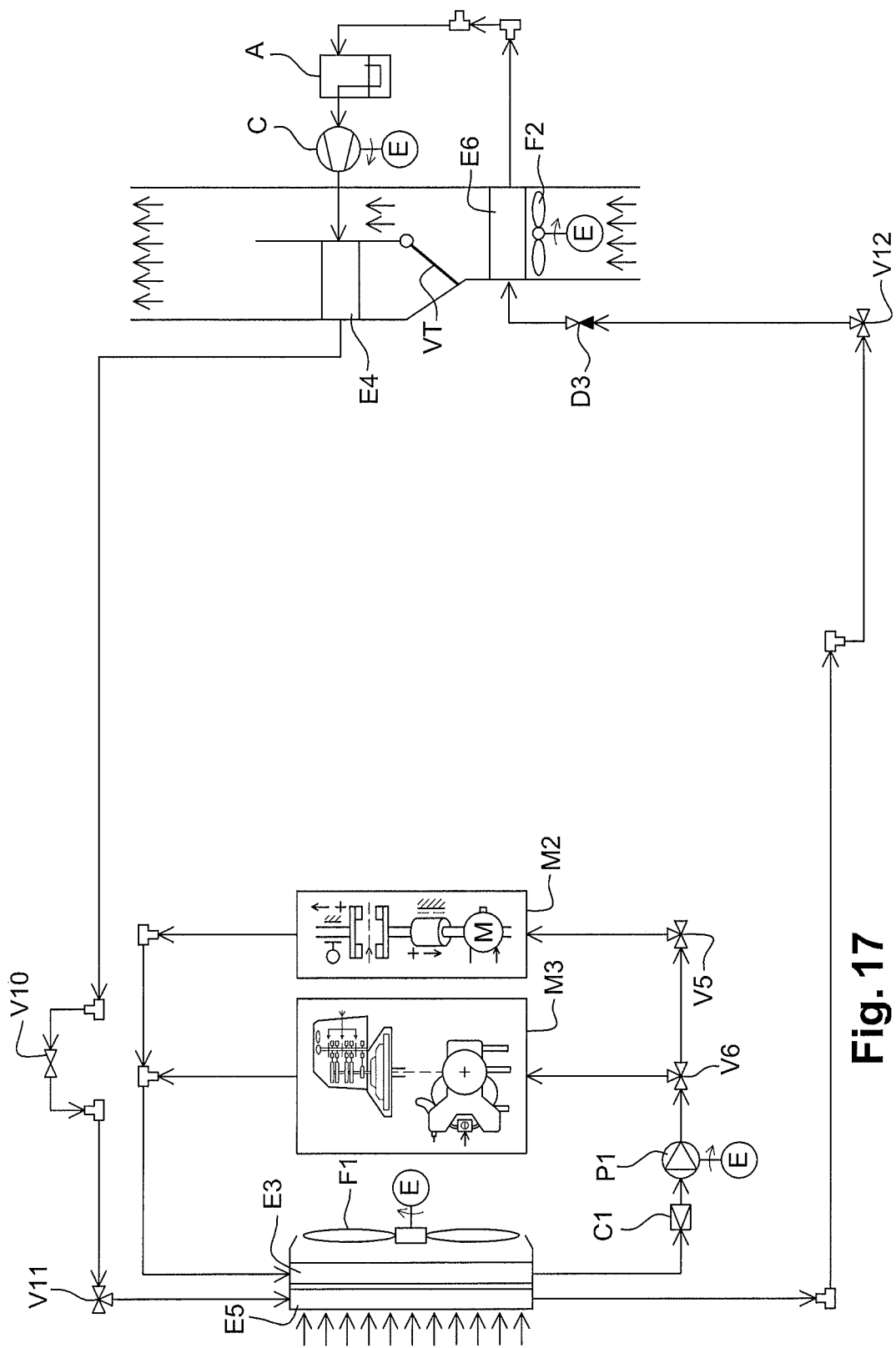

FIG. 17 illustrates a sixteenth operating mode of the installation, in which:
- the heat transfer fluid from the pump P1 flows successively through the heating and/or cooling means M2 and/or M3, via valves V5, V6, exchanger E3 and check valve C1 before passing through the pump P1 again,
- the refrigerant fluid from compressor C flows successively through exchanger E4 (which plays no active role), valve V10, valve V11, exchanger E5, valve V12, regulator D3, exchanger E6 and accumulator A before passing through compressor C again.

Figure 18:
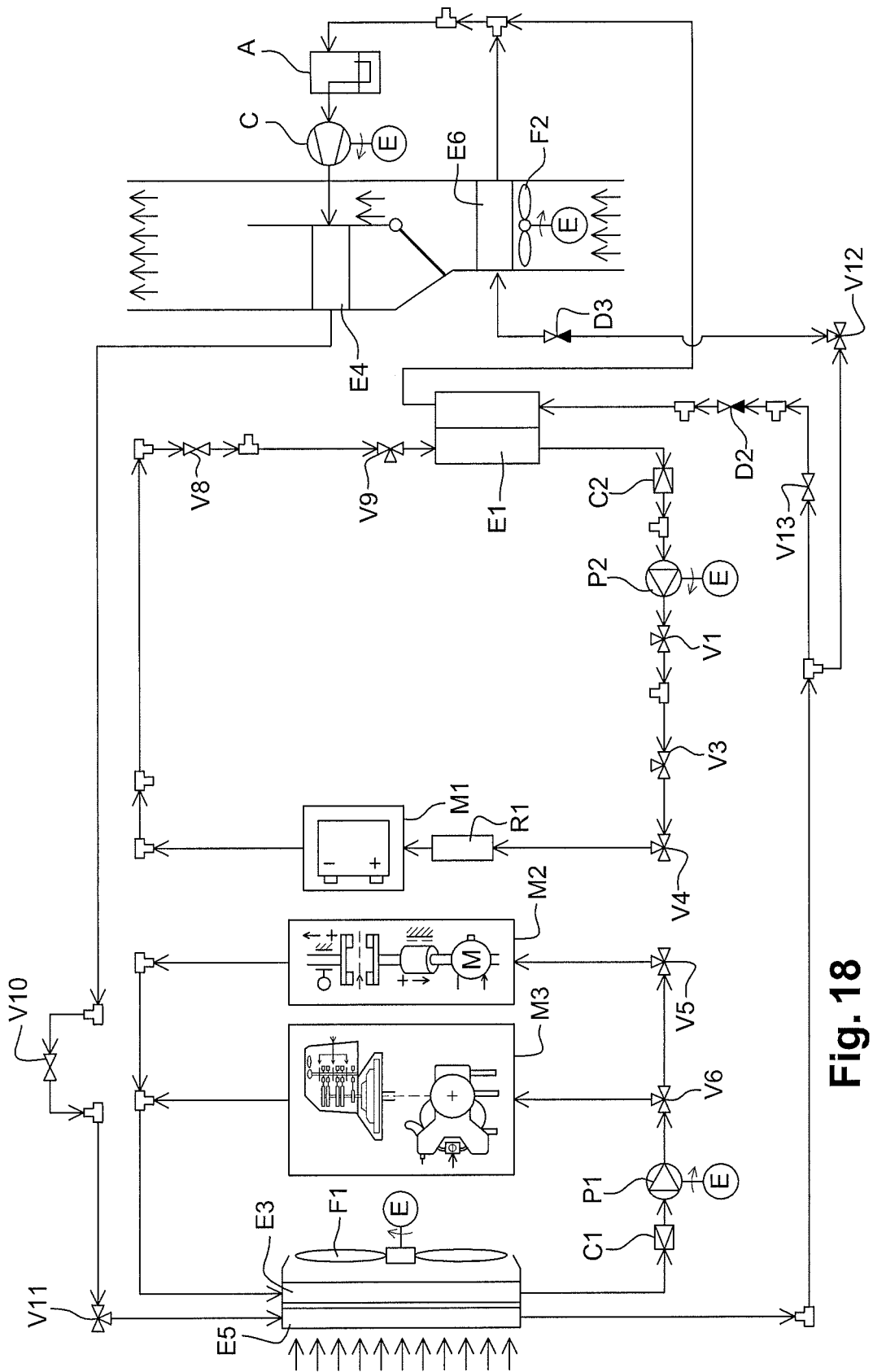

In the sixteenth mode, the second and/or third component is cooled using the frigories provided by the outside air, via the exchanger E3. In addition, the exchanger E6, forming an evaporator, cools the air intended for the passenger compartment. It should be noted that, in this operating mode, the air passing through duct 3 is supplied by the VT shutter to duct 3d, so as to divert the corresponding air from the exchanger E4, so that the latter plays no active role, although it is passed through by the refrigerant fluid. FIG. 18 illustrates a seventeenth operating mode of the installation, in which:
- the heat transfer fluid circulates in a first loop in which the fluid from pump P2 flows successively through valve V1, valve V3, valve V4, heating means R1 (active or not as needed), heating and/or cooling means M1, valve V8, valve V9, exchanger E1 and check valve C2, before re-entering pump P2, and in a second loop in which the fluid from pump P1 successively passes through the heating and/or cooling means M2 and/or M3, via the valves V5, V6, exchanger E3 and check valve C1 before re-entering pump P1, the refrigerant fluid from compressor C successively passes through exchanger E4 (which plays no active role), valve V10, valve V11, exchanger E5, a first part of the refrigerant fluid then passes through valve V13, regulator D2, exchanger E1 and accumulator A before passing through compressor C again, while a second part of the refrigerant fluid is diverted upstream of accumulator A, through valve V12, regulator D3 and exchanger E6.

In the seventeenth mode, the first component is cooled using the frigories provided by the exchanger E1. The second and/or third component is cooled using the frigories provided by the outside air, via the exchanger E3. As before, the exchanger E6 cools the air intended for the passenger compartment.

Figure 19:
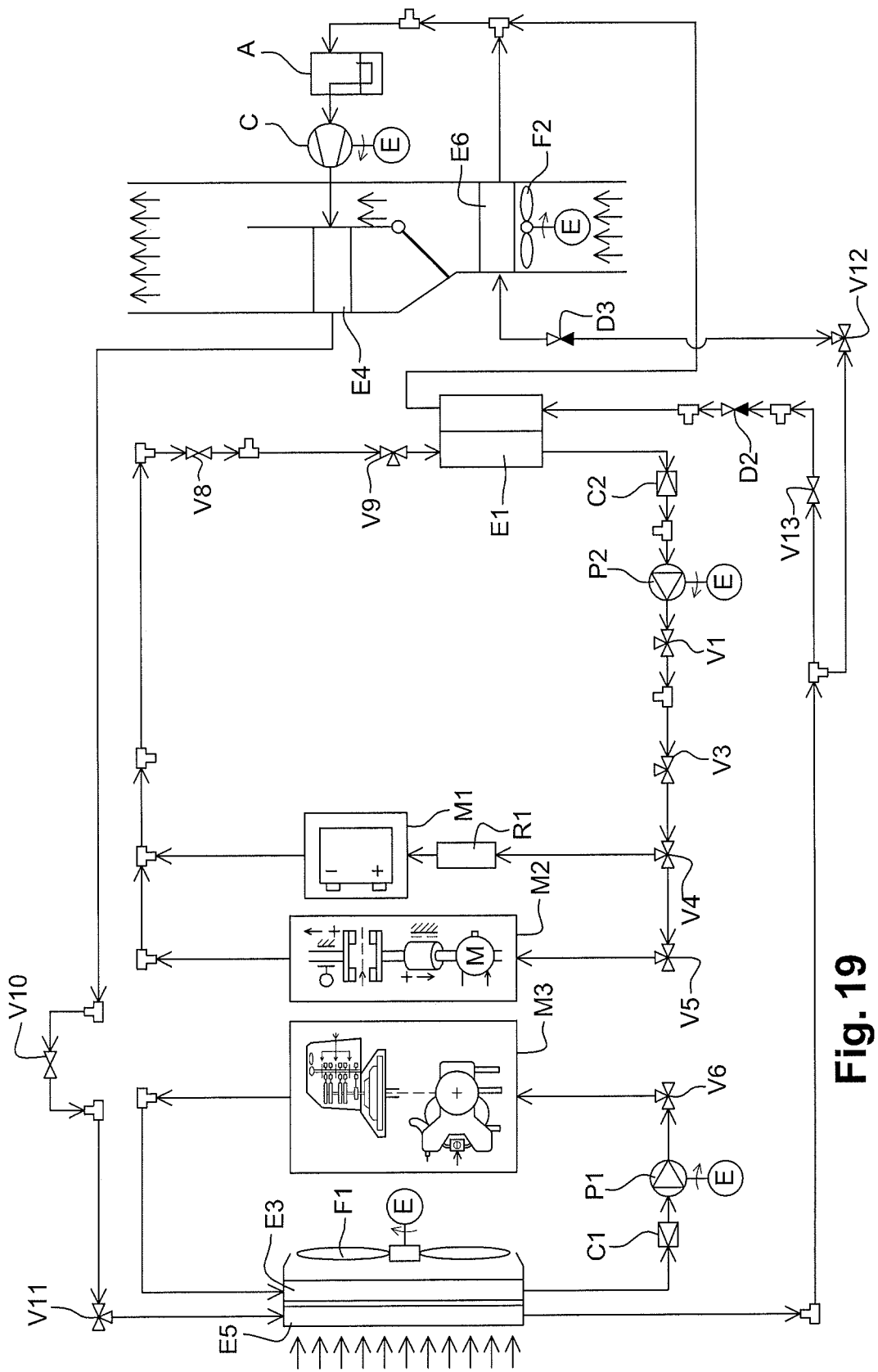

FIG. 19 illustrates an eighteenth operating mode of the installation, in which:
the heat transfer fluid circulates in a first loop in which the heat transfer fluid from pump P2 successively passes through valve V1, means R1 and M1 (means R1 being active or not as needed) and/or means M2, via valves V4, V5, valve V8 and valve V9, the exchanger E1 and the check valve C2 before passing through pump P2 again, and in a second loop in which the heat transfer fluid from pump P1 successively passes through the valve V6, the heating and/or cooling means M3, the exchanger E3 and the check valve C1 before passing through pump P1 again,
the refrigerant fluid from compressor C successively passes through exchanger E4 (which plays no active role), valve V10, valve V11, exchanger E5, a first part of the refrigerant fluid then passes through valve V13, regulator D2, exchanger E1 and accumulator A before passing through compressor C again, while a second part of the refrigerant fluid is diverted upstream of accumulator A, through valve V12, regulator D3 and exchanger E6.

In the eighteenth mode, the first and/or second component is cooled using the frigories provided by the exchanger E1. The third component is cooled using the frigories provided by the outside air, via the exchanger E3. As before, the exchanger E6 cools the air intended for the passenger compartment.

With reference to FIGS. 20 to 26, different operating modes in which the air outside the vehicle is relatively hot, e. g. above 25° C., will now be described.

Figure 20:
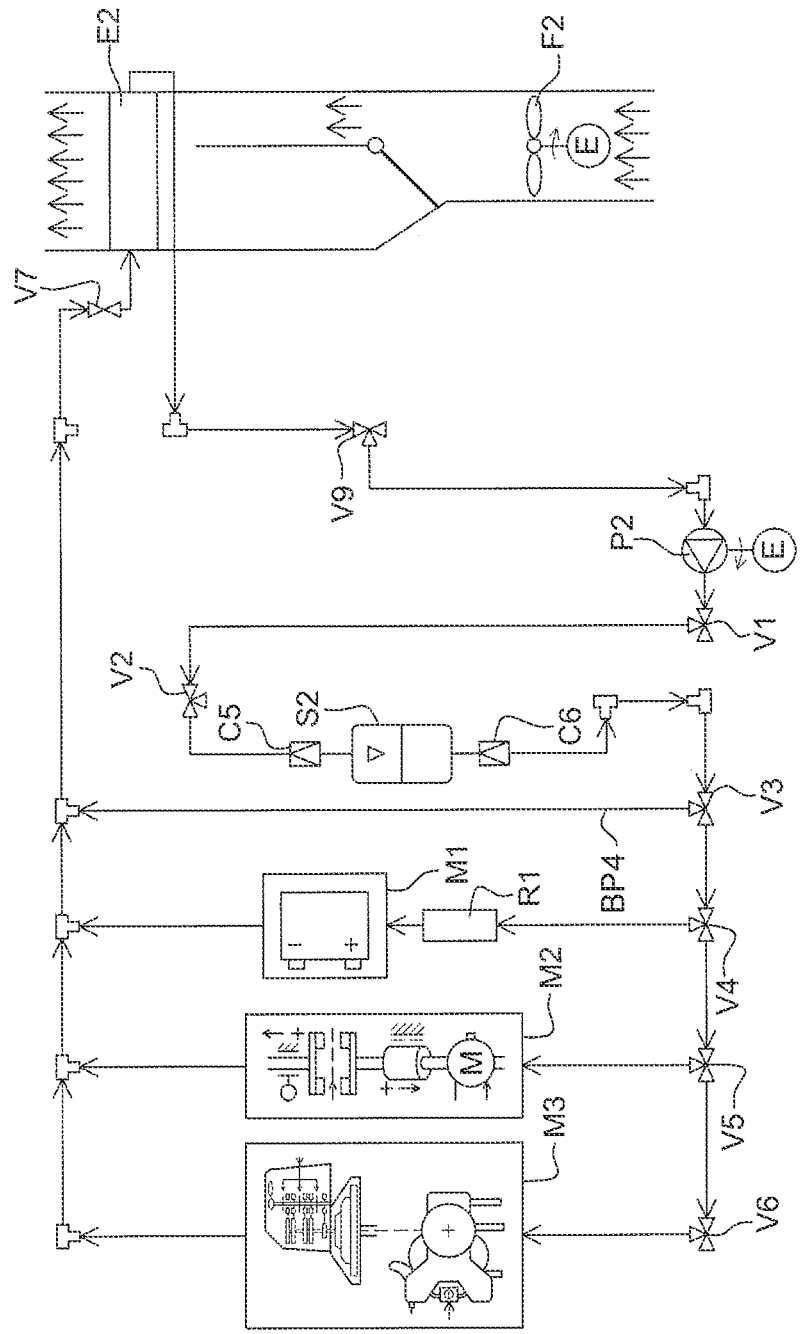

FIG. 20 illustrates a nineteenth operating mode of the installation, in which the heat transfer fluid from pump P2 passes through valve V1, valve V2, check valve C5, refrigerant storage unit S2, valve C6, the heat transfer fluid then passing through at least one of the heating and/or cooling means R1 and M1 (the means R1 being active or not), M2, M3 via valves V4, V5, V6, and/or be derived from said means R1, M1, M2, M3 in whole or in part through valve V3 and line BP4, the heat transfer fluid then circulating through valve V8 and valve V9 before passing through pump P2 again.

In the nineteenth mode, frigories can be transferred from the refrigerant storage unit to the component(s) of the vehicle to be cooled, such as for example the battery, the corresponding electric motor(s) and/or inverter(s), and/or the internal combustion engine. The frigories from the refrigerant storage unit are also transferred to the second heat exchanger, so as to quickly cool the vehicle's interior and ensure user comfort.

Figure 21:
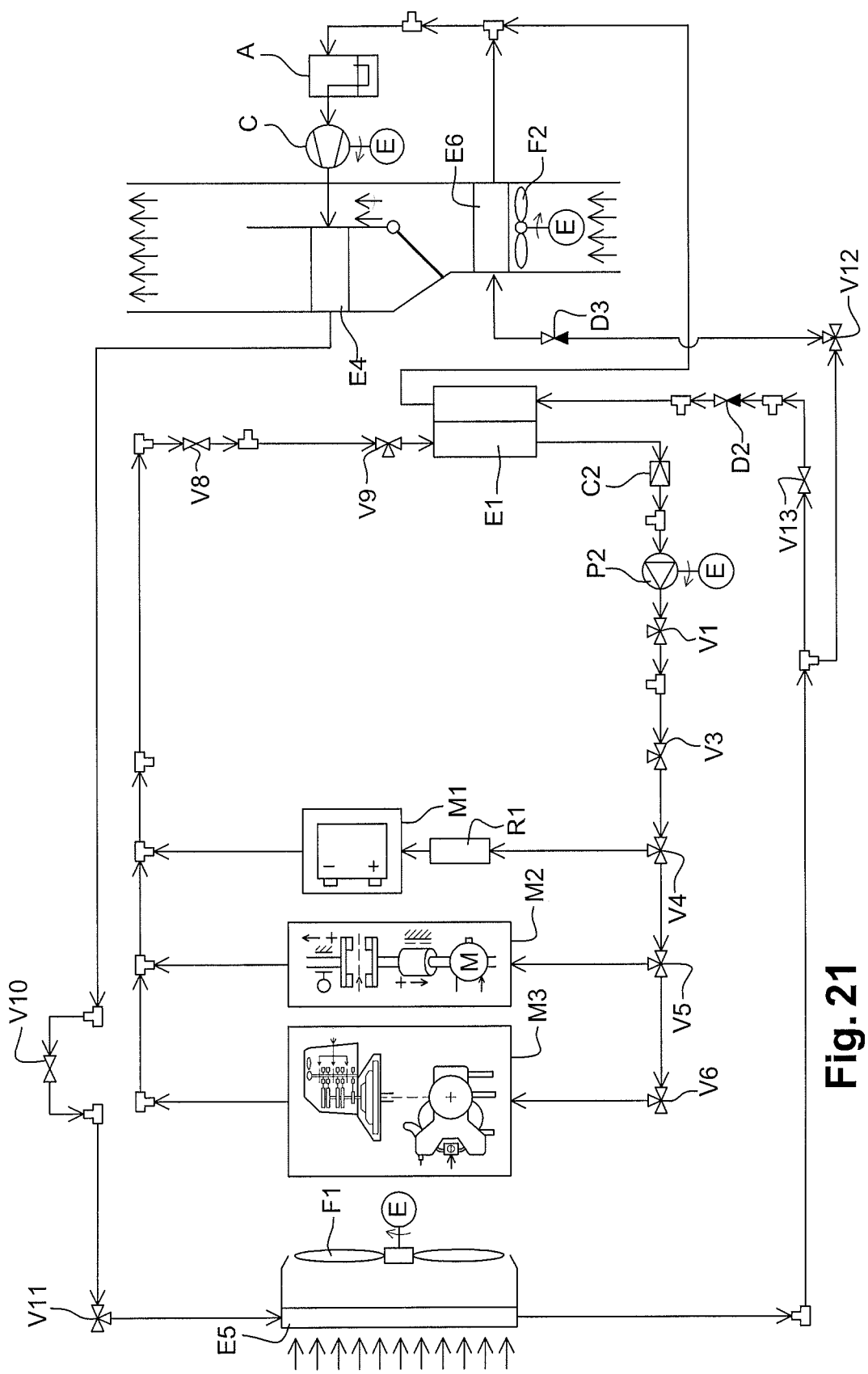

FIG. 21 illustrates a twentieth operating mode of the installation, in which:
the heat transfer fluid from pump P2 successively passes through valve V1, valve V3, at least one of the heating and/or cooling means R1 and M1 (the means R1 being active or not), M2, M3 via valves V4, V5, V6, valve V8, valve V9, exchanger E1 and check valve C2, before passing through pump P2 again,
the refrigerant fluid from compressor C successively passes through exchanger E4 (which plays no active role), valve V10, valve V11, exchanger E5, a first part of the refrigerant fluid then passing through valve V13, regulator D2, exchanger E1 and accumulator A before passing through compressor C again, while a second part of the refrigerant fluid is diverted upstream of accumulator A, through valve V12, regulator D3 and exchanger E6.

In the twentieth mode, the first, second and/or third component is cooled using the frigories provided by the exchanger E1. In addition, the exchanger E6 cools the air intended for the passenger compartment.

Figure 22:
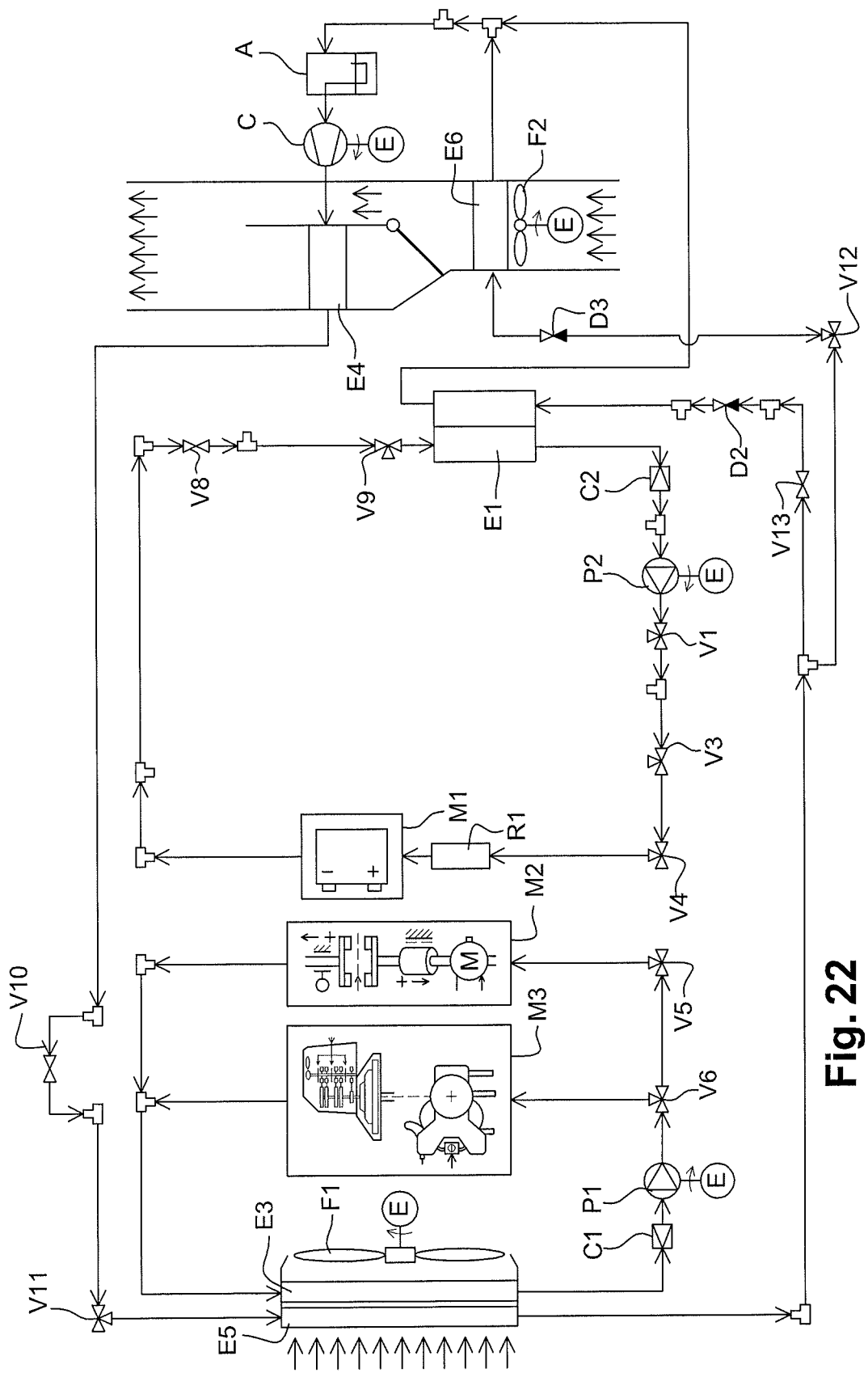

FIG. 22 illustrates a twenty-first operating mode of the installation, in which:
the heat transfer fluid circulates in a first loop in which the fluid from pump P2 flows successively through valve V1, valve V3, valve V4, heating means R1 (active or not as needed), heating and/or cooling means M1, valve V8, valve V9, exchanger E1 and check valve C2, before re-entering pump P2, and in a second loop in which the fluid from pump P1 successively passes through the heating and/or cooling means M2 and/or M3, via the valves V5, V6, exchanger E3 and check valve C1 before re-entering pump P1,
the refrigerant fluid from compressor C successively passes through exchanger E4 (which plays no active role), valve V10, valve V11, exchanger E5, a first part of the refrigerant fluid then passing through valve V13, regulator D2, exchanger E1 and accumulator A before passing through compressor C again, while a second part of the refrigerant fluid is diverted upstream of accumulator A, through valve V12, regulator D3 and exchanger E6.

In the twenty-first mode, the first component is cooled using the frigories provided by the exchanger E1. The second and/or third component is cooled using the frigories provided by the outside air, via the exchanger E3. As before, the exchanger E6 cools the air intended for the passenger compartment.

Figure 23:
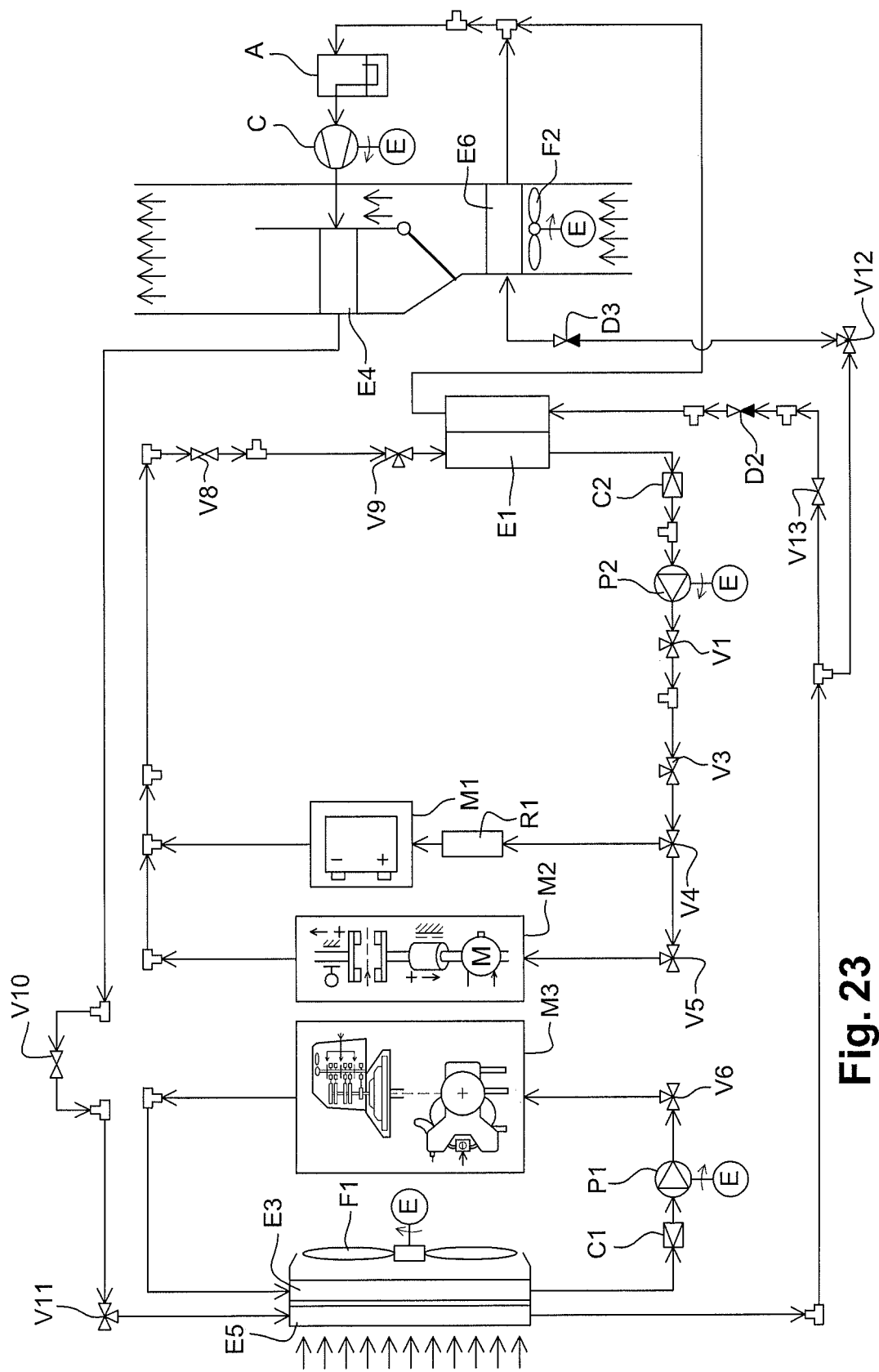

FIG. 23 illustrates a twenty-second operating mode of the installation, in which:
the heat transfer fluid circulates in a first loop in which the heat transfer fluid from pump P2 successively passes through valve V1, means R1 and M1 (means R1 being active or not as needed) and/or means M2, via valves V4, V5, valve V8 and valve V9, the exchanger E1 and the check valve C2 before passing through pump P2 again, and in a second loop in which the heat transfer fluid from pump P1 successively passes through the valve V6, the heating and/or cooling means M3, the exchanger E3 and the check valve C1 before passing through pump P1 again,
the refrigerant fluid from compressor C successively passes through exchanger E4 (which plays no active role), valve V10, valve V11, exchanger E5, a first part of the refrigerant fluid then passing through valve V13, regulator D2, exchanger E1 and accumulator A before passing through compressor C again, while a second part of the refrigerant fluid is diverted upstream of accumulator A, through valve V12, regulator D3 and exchanger E6.

In the twenty-second mode, the first and/or second component is cooled using the frigories provided by the exchanger E1. The third component is cooled using the frigories provided by the outside air, via the exchanger E3. As before, the exchanger E6 cools the air intended for the passenger compartment.

Figure 24:
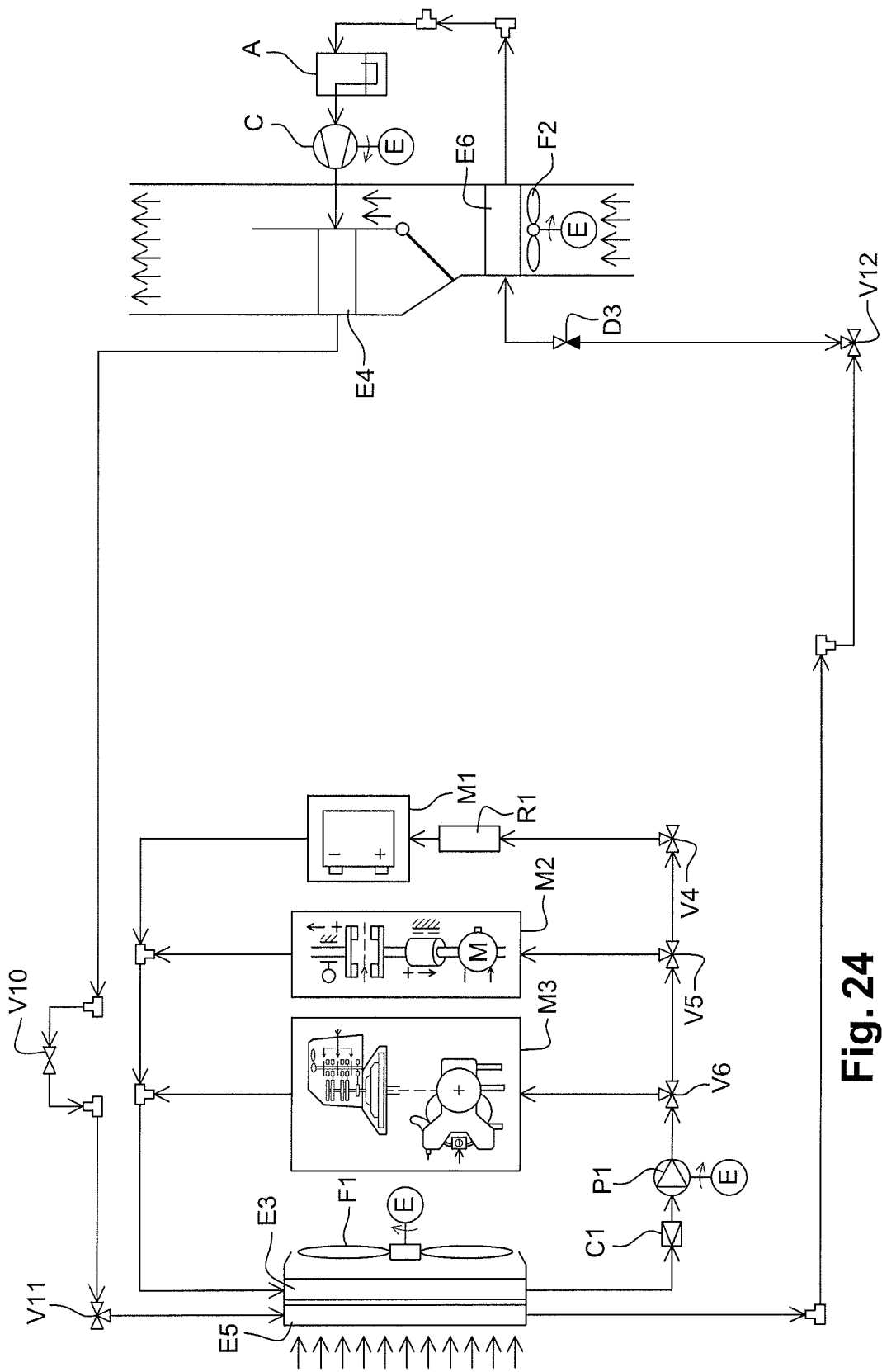

FIG. 24 illustrates a twenty-third operating mode of the installation, in which:
the heat transfer fluid from the pump P1 flows successively through the heating and/or cooling means M1 and R1, and/or M2 and/or M3, via the valves V4, V5, V6, the exchanger E3 and the check valve C1 before passing through the pump P1 again,
the refrigerant fluid from compressor C flows successively through exchanger E4 (which plays no active role), valve V10, valve V11, exchanger E5, valve V12, regulator D3, exchanger E6 and accumulator A before passing through compressor C again.

In the twenty-third mode, the first, second and/or third component is cooled using the frigories provided by the outside air, via the exchanger E3. As before, the exchanger E6 cools the air intended for the passenger compartment.

Figure 25:
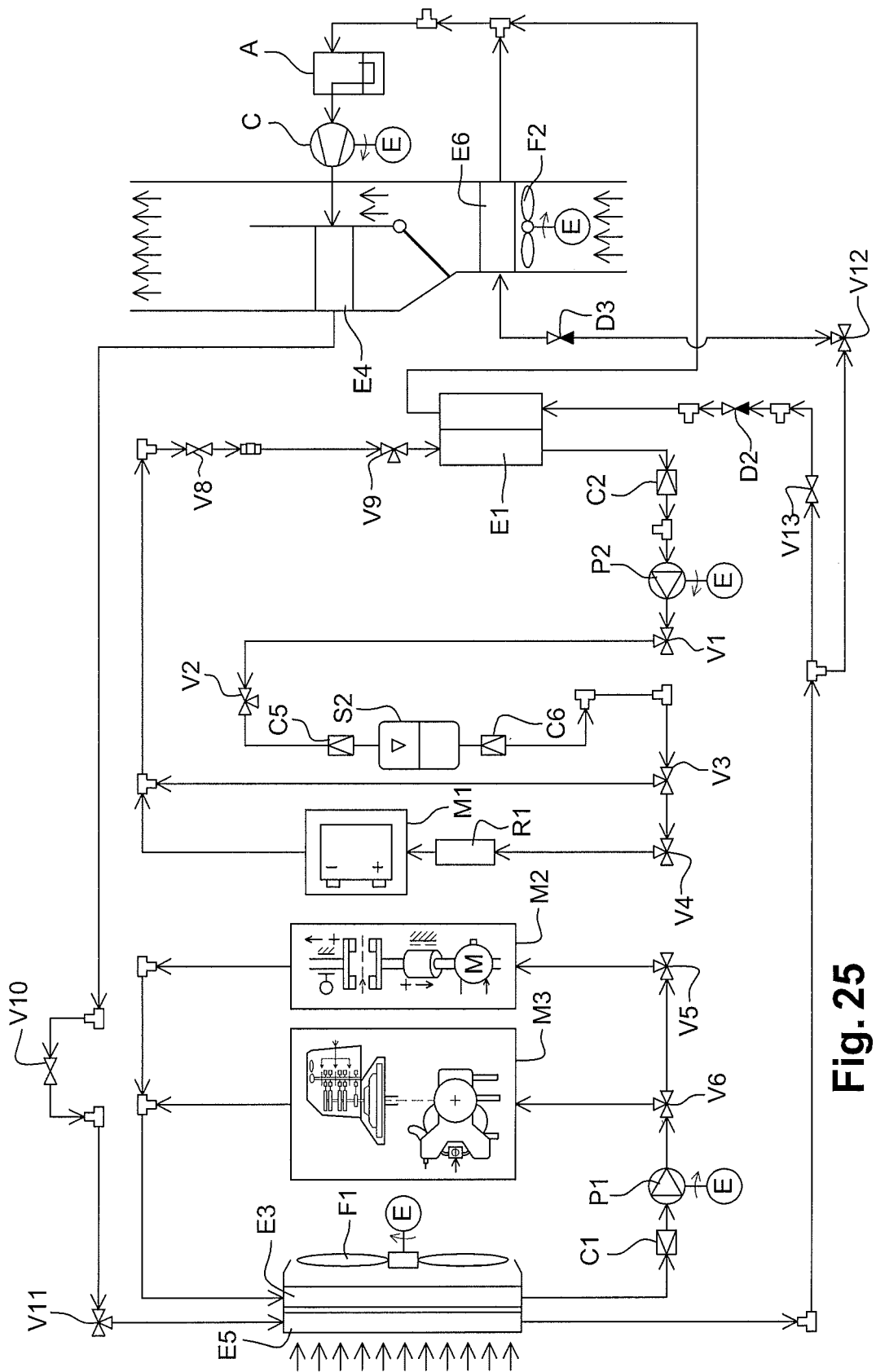

FIG. 25 illustrates a twenty-fourth operating mode of the installation, in which:
the heat transfer fluid circulates in a first loop in which the fluid from pump P2 successively passes through valve V1, check valve C5, refrigerant storage unit S2, check valve C6, valve V3, at least part of the heat transfer fluid then optionally flowing through means R1 and M1, all the heat transfer fluid from the first loop then passing through valve V8, valve V9, the exchanger E1 and the check valve C2 before passing through the pump P2 again, and in a second loop in which the fluid from the pump P1 successively passes through the heating and/or cooling means M2 and/or M3, via the valves V5, V6, the exchanger E3 and the check valve C1 before passing through the pump P1 again,
the refrigerant fluid from compressor C successively passes through exchanger E4 (which plays no active role), valve V10, valve V11, exchanger E5, a first part of the refrigerant fluid then passing through valve V13, regulator D2, exchanger E1 and accumulator A before passing through compressor C again, while a second part of the refrigerant fluid is diverted upstream of accumulator A, through valve V12, regulator D3 and exchanger E6.

In the twenty-fourth mode, the refrigerant storage unit is fully recharged using the frigories provided by the exchanger E1, some of which can be used to cool the first component. The second and/or third component is cooled using the frigories provided by the outside air, via the exchanger E3. As before, the exchanger E6 cools the air intended for the passenger compartment.

Figure 26:
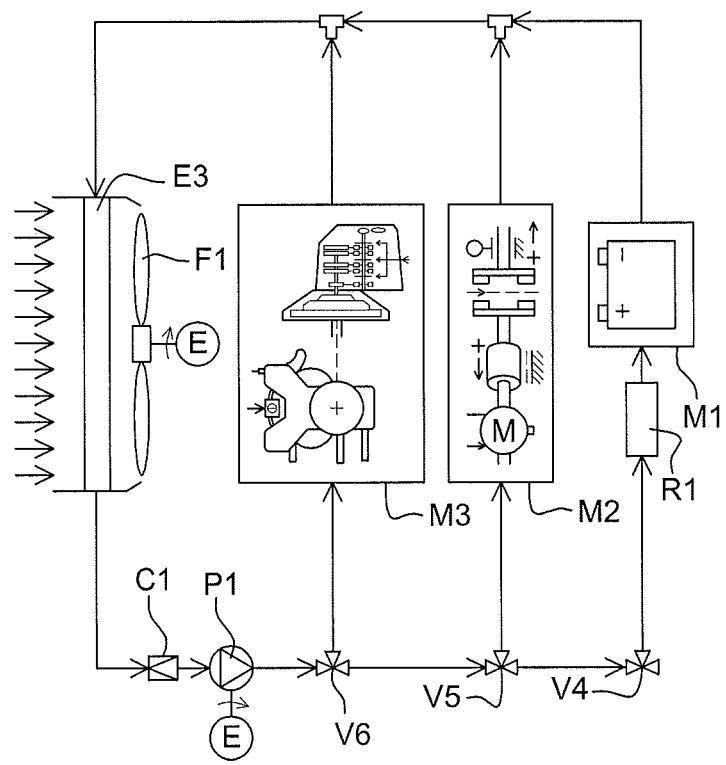

FIG. 26 illustrates a twenty-fifth operating mode of the installation, in which the heat transfer fluid flows in a loop through the pump P1, one or more of the heating and/or cooling means R1 and M1 (the means R1 being active or not), M2, M3, via the valves V4, V5, V6, the exchanger E3 and the check valve C1 before passing through the pump P1 again.

In the twenty-fifth mode, the first, second and/or third component is cooled by the frigories provided by the outside air, via the exchanger E3.

The installation according to the invention thus makes it possible to ensure in a simple and reliable way a large number of operating modes using a limited number of elements. The cost and weight of such an installation are therefore also limited.

The invention claimed is:

1. An installation for the thermal conditioning of a passenger compartment and/or at least one component of a motor vehicle, comprising:
   a heat transfer fluid circuit for circulating a heat transfer fluid; and
   a refrigerant fluid circuit for circulating a refrigerant fluid and capable of forming a heat pump type circuit,
   wherein the heat transfer fluid circuit comprises:
      at least one component of a motor vehicle to be heated and/or cooled by the heat transfer fluid circuit,
      means for storing calories and/or frigories, the means for storing calories and/or frigories comprising a phase change material, and
      a first heat exchanger forming an evaporator and capable of exchanging heat with the refrigerant fluid circuit,
      wherein the heat transfer fluid circuit is configured to draw frigories and/or calories from the means for storing calories and/or frigories or the first heat exchanger and transfer them to the at least one component,
   wherein the heat transfer fluid circuit comprises a second heat exchanger capable of heating or cooling air intended to enter the passenger compartment of the vehicle, the heat transfer fluid circuit being capable of drawing frigories and/or calories from the means for storing calories and/or frigories or the first heat exchanger, so as to transfer them to the second heat exchanger,
   wherein the refrigerant fluid circuit comprises a fourth heat exchanger capable of forming a condenser and capable of exchanging heat with air intended to enter the passenger compartment of the vehicle,
   wherein the refrigerant fluid circuit comprises a sixth heat exchanger capable of forming an evaporator and capable of exchanging heat with air intended to enter the passenger compartment of the vehicle,
   wherein the at least one component comprises a first component comprising a battery, a second component comprising an electric motor and a third component comprising an internal combustion engine, and
   wherein the heat transfer fluid circuit and the refrigerant fluid transfer circuit are configured to operate in at least one of the following modes:
      a mode in which the heat transfer fluid circulates in a loop comprising at least, successively, the means for storing calories and/or frigories configured to provide the heat transfer fluid directly and optionally to one of the at least one component, and the second heat exchanger,
      a mode in which the heat transfer fluid circulates in a loop comprising at least successively the at least one component and the first heat exchanger, the refrigerant fluid circulating in a loop comprising at least successively a compressor, the fourth heat exchanger, a first regulator, a fifth heat exchanger, a first part of the refrigerant fluid then passing through a second regulator and the first heat exchanger before returning to the compressor, while a second part of the refrigerant fluid is diverted to the compressor, a mode in which the heat transfer fluid circulates in a loop comprising at least successively the at least one component and the first heat exchanger, the refrigerant fluid circulating in a loop comprising at least successively the compressor, the fourth heat exchanger, the second regulator and the first heat exchanger, and a mode in which the heat transfer fluid circulates in a loop comprising at least successively the means for storing calories and/or frigories and the at least one component, the refrigerant fluid circulating in a loop comprising at least successively the compressor, the fourth heat exchanger, the first regulator and the fifth heat exchanger.

2. The installation according to claim 1, wherein the means for storing calories and/or frigories comprise at least one heat storage unit and at least one refrigerant storage unit.

3. The installation according to claim 1, wherein the heat transfer fluid circuit comprises a third heat exchanger capable of exchanging heat with outside air, the heat transfer fluid circuit configured to transfer frigories from the third heat exchanger to at least one of the vehicle components.

4. The installation according to claim 1, wherein the refrigerant fluid circuit comprises the fifth heat exchanger capable of forming an evaporator and/or a condenser and capable of exchanging heat with air outside the vehicle.

5. The installation according to claim 1, wherein the heat transfer fluid circuit comprises first heating means capable of heating the heat transfer fluid upstream of one of the vehicle components.

6. The installation according to claim 1, wherein the heat transfer fluid circuit comprises second heating means suitable for heating the heat transfer fluid to be circulated in the means for storing calories and/or frigories.

7. The installation according to claim 1, further comprising third heating means capable of heating the air intended to enter the passenger compartment of the vehicle.

8. The installation according to claim 1, wherein the heat transfer fluid circuit further comprises bypass means capable of diverting all or part of the heat transfer fluid from said at least one component.

9. An installation for the thermal conditioning of a passenger compartment and/or at least one component of a motor vehicle, comprising:
a heat transfer fluid circuit for circulating a heat transfer fluid; and
a refrigerant fluid circuit for circulating a refrigerant fluid and capable of forming a heat pump type circuit,
wherein the heat transfer fluid circuit comprises:
at least one component of a motor vehicle to be heated and/or cooled by the heat transfer fluid circuit,
means for storing calories and/or frigories, the means for storing calories and/or frigories comprising a phase change material, and
a first heat exchanger forming an evaporator and capable of exchanging heat with the refrigerant fluid circuit,
wherein the heat transfer fluid circuit is configured to draw frigories and/or calories from the means for storing calories and/or frigories or the first heat exchanger and transfer them to the at least one component,
wherein the refrigerant fluid circuit comprises a second heat exchanger capable of heating or cooling air intended to enter the passenger compartment of the vehicle, the heat transfer fluid circuit being capable of drawing frigories and/or calories from the means for storing calories and/or frigories or the first heat exchanger, so as to transfer them to the second heat exchanger, wherein the refrigerant fluid circuit comprises a fourth heat exchanger capable of forming a condenser and capable of exchanging heat with air intended to enter the passenger compartment of the vehicle, wherein the refrigerant fluid circuit comprises a sixth heat exchanger capable of forming an evaporator and capable of exchanging heat with air intended to enter the passenger compartment of the vehicle, wherein the at least one component comprises a first component comprising a battery, a second component comprising an electric motor and a third component comprising an internal combustion engine, and wherein the heat transfer fluid circuit and the refrigerant fluid transfer circuit are configured to operate in at least one of the following modes:

a mode in which the heat transfer fluid circulates in a first loop comprising at least successively the means for storing calories and/or frigories and the first component, and optionally in a second loop comprising at least successively the second and/or third component, and the third heat exchanger, the refrigerant fluid circulating in a loop comprising at least successively a compressor, the fourth heat exchanger, a first regulator and a fifth heat exchanger, a mode in which the heat transfer fluid flows in a first loop comprising at least successively the first component, and the first heat exchanger, and optionally in a second loop comprising at least successively the second and/or the third component, and a third heat exchanger, the refrigerant fluid circulating in a loop comprising at least successively the compressor, the fifth heat exchanger, a first part of the refrigerant fluid then passing through a second regulator and the first heat exchanger before returning to the compressor, a second part of the refrigerant fluid then passing through a third regulator and the sixth heat exchanger before returning to the compressor, a mode in which the heat transfer fluid circulates in a loop comprising at least successively the means for storing calories and/or frigories configured to provide the heat transfer fluid directly and optionally to one of the at least one component, and the second heat exchanger, and a mode in which the heat transfer fluid flows in a first loop comprising at least successively the means for storing calories and/or frigories, optionally the first component, and the first heat exchanger, and optionally in a second loop comprising at least successively the second and/or the third component, and the third heat exchanger, the refrigerant fluid circulating in a loop comprising at least successively the compressor, the fifth heat exchanger, a first part of the refrigerant fluid passing through the second regulator and the first heat exchanger before returning to the compressor, a second part of the refrigerant fluid passing through the third regulator and the sixth heat exchanger before returning to the compressor.

10. The installation according to claim 9, wherein the means for storing calories and/or frigories comprise at least one heat storage unit and at least one refrigerant storage unit.

11. The installation according to claim 9, wherein the heat transfer fluid circuit comprises a third heat exchanger capable of exchanging heat with outside air, the heat transfer fluid circuit configured to transfer frigories from the third heat exchanger to at least one of the vehicle components.

12. The installation according to claim 9, wherein the refrigerant fluid circuit comprises the fifth heat exchanger capable of forming an evaporator and/or a condenser and capable of exchanging heat with air outside the vehicle.

13. The installation according to claim 9, wherein the heat transfer fluid circuit comprises first heating means capable of heating the heat transfer fluid upstream of one of the vehicle components.

14. The installation according to claim 9, wherein the heat transfer fluid circuit comprises second heating means suitable for heating the heat transfer fluid to be circulated in the means for storing calories and/or frigories.

15. The installation according to claim 9, further comprising third heating means capable of heating the air intended to enter the passenger compartment of the vehicle.

16. The installation according to claim 9, wherein the heat transfer fluid circuit further comprises bypass means capable of diverting all or part of the heat transfer fluid from said at least one component.

\* \* \* \* \*